United States Patent
Tomita et al.

(10) Patent No.: US 10,870,317 B2
(45) Date of Patent: Dec. 22, 2020

(54) PNEUMATIC TIRE

(71) Applicant: SUMITOMO RUBBER INDUSTRIES, LTD., Kobe (JP)

(72) Inventors: Shintaro Tomita, Kobe (JP); Daisuke Kudo, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 463 days.

(21) Appl. No.: 15/418,173

(22) Filed: Jan. 27, 2017

(65) Prior Publication Data

US 2017/0225522 A1 Aug. 10, 2017

(30) Foreign Application Priority Data

| Feb. 4, 2016 | (JP) | 2016-019382 |
| Feb. 4, 2016 | (JP) | 2016-019386 |
| Feb. 24, 2016 | (JP) | 2016-033325 |

(51) Int. Cl.
*B60C 15/02* (2006.01)
*B60C 15/06* (2006.01)
*B60C 15/024* (2006.01)

(52) U.S. Cl.
CPC .......... *B60C 15/06* (2013.01); *B60C 15/0242* (2013.01); *B60C 2015/0614* (2013.01)

(58) Field of Classification Search
CPC ............... B60C 15/0242; B60C 15/06; B60C 2015/0614
See application file for complete search history.

(56) References Cited

U.S. PATENT DOCUMENTS

| 6,257,290 B1 * | 7/2001 | Sakamoto ............. B60C 1/0016 152/209.16 |
| 2014/0027034 A1 * | 1/2014 | Molzow-Voit ...... B60C 15/0045 152/513 |
| 2015/0075694 A1 | 3/2015 | Nagai |
| 2015/0217604 A1 | 8/2015 | Nagai |

FOREIGN PATENT DOCUMENTS

| DE | 102014207771 A1 * | 10/2015 | ............... B60C 9/14 |
| EP | 0962340 A2 | 12/1999 | |
| JP | 2015120459 A * | 7/2015 | ............. B60C 13/02 |

OTHER PUBLICATIONS

Machine translation of JP2015-120459 (no date).*

* cited by examiner

*Primary Examiner* — Justin R Fischer
*Assistant Examiner* — Philip N Schwartz
(74) *Attorney, Agent, or Firm* — Birch, Stewart, Kolasch & Birch, LLP

(57) ABSTRACT

A rim protector 40 of a tire 2 projects from a reference surface 44 of each side piece 38. The rim protector 40 has a first inclined surface 50 and a second inclined surface 52. A profile of the reference surface 44 includes an outer circular arc and an inner circular arc which are tangent to each other at a reference position. A first circular arc of the first inclined surface 50 is tangent to the outer circular arc, and a second circular arc of the second inclined surface 52 is tangent to the inner circular arc. A ratio of a height H relative to a cross-sectional height SH is equal to or greater than 0.27 and equal to or less than 0.34. A projecting length W is equal to or greater than 12 mm and equal to or less than 18 mm.

11 Claims, 6 Drawing Sheets

PNEUMATIC TIRE

This application claims priority on Patent Application Nos. 2016-19382 and 2016-19386 filed in JAPAN on Feb. 4, 2016 and Patent Application No. 2016-33325 filed in JAPAN on Feb. 24, 2016. The entire contents of these Japanese Patent Applications are hereby incorporated by reference.

BACKGROUND OF THE INVENTION

Field of the Invention

The present invention relates to pneumatic tires. Specifically, the present invention relates to pneumatic tires including rim protectors at side surfaces thereof.

Description of the Related Art

On a road having a sidewalk, a curb is provided between the roadway and the sidewalk. When a vehicle is moved close to a road shoulder, the sidewall of a tire may come into contact with the curb. Due to this contact, the sidewall may be damaged.

A tire is mounted onto a rim. The rim includes a flange. When a vehicle is moved close to a road shoulder, the flange may come into contact with a curb. Due to this contact, the flange may be damaged.

A rim protector may be provided at each side surface of a tire. The rim protector extends in the circumferential direction of the tire. The rim protector projects outward in the axial direction of the tire. With a tire including rim protectors, when a vehicle is moved close to a road shoulder, a sidewall or a flange does not come into contact with a curb, but the rim protector comes into contact with the curb. This contact contributes to prevention of damage of the sidewall or the flange. Examples of such rim protectors are disclosed in JP2013-220786 (US2015/0075694A1) and JP2014-083994 (US2015/0217604A1).

There is a trend in which consideration is given to the environment by reducing influence of tires on the gas mileages of vehicles. Since the labeling system has been introduced, there are many users who place importance on rolling resistance when selecting tires. The time has come in which it is taken for granted that tires have low rolling resistance. In light of low rolling resistance, tires having low weights are desired.

For example, the weight of a tire can be reduced when the volumes of components such as sidewalls are reduced.

However, the reduction in the volumes influences the stiffness of the tire.

A rim protector needs to have a size (or shape) to some extent in order to exert a function thereof. The rim protector contributes to the stiffness of a tire. The rim protector influences the weight of the tire.

A rim applicable to a tire is specified in a standard on which the tire is based. In the standard, application of a plurality of rims having different sizes to one tire is allowed. Thus, depending on the size (or shape) of a rim protector, when a rim having a largest size is selected from among a plurality of applicable rims, the rim protector may not contribute to prevention of damage of a flange. On the other hand, when a rim having a smallest size is selected from among the plurality of applicable rims, the rim protector may interfere with a flange to make it impossible to appropriately mount the tire onto the rim. In order for the rim protector to exert its function for all the applicable rims, it is necessary to appropriately adjust the size (or shape) of the rim protector.

An object of the present invention is to provide a pneumatic tire that has a rim protector capable of exerting its function and that has enhanced stiffness while an increase in the weight of the tire is suppressed.

SUMMARY OF THE INVENTION

A pneumatic tire according to the present invention includes a tread, a pair of side pieces, a pair of beads, and a carcass. Each side piece extends from the tread substantially inward in a radial direction. Each bead is located inward of the side piece in an axial direction at a radially inner portion of the side piece. The carcass extends along inner sides of the tread and the side pieces and on and between the one bead and the other bead.

In the tire, each side piece includes a rim protector extending in a circumferential direction. The rim protector projects from a reference surface of the side piece outward in the axial direction. The rim protector has a first inclined surface extending from a top of the rim protector substantially outward in the radial direction and a second inclined surface extending from the top of the rim protector substantially inward in the radial direction. A profile of the reference surface includes an outer circular arc extending substantially outward in the radial direction from a reference position corresponding to a position at which the tire has a maximum width in the axial direction, and an inner circular arc extending substantially inward in the radial direction from the reference position. The outer circular arc and the inner circular arc are tangent to each other at the reference position. When each of a profile of the first inclined surface and a profile of the second inclined surface is represented by a circular arc, the circular arc that represents the profile of the first inclined surface is defined as a first circular arc, and the circular arc that represents the profile of the second inclined surface is defined as a second circular arc, the first circular arc is tangent to the outer circular arc and the second circular arc is tangent to the inner circular arc. A ratio of a height H in the radial direction from a bead base line of the tire to the top relative to a cross-sectional height SH of the tire is equal to or greater than 0.27 and equal to or less than 0.34. A projecting length W of the rim protector is equal to or greater than 12 mm and equal to or less than 18 mm.

Preferably, in the pneumatic tire, the first inclined surface has a shape projecting outward. The second inclined surface has a shape projecting inward.

Preferably, in the pneumatic tire, a ratio of a radius of curvature R2 of the second circular arc relative to a radius of curvature R1 of the first circular arc is equal to or greater than 0.066 and equal to or less than 0.117.

Preferably, in the pneumatic tire, each side piece includes a sidewall extending from the tread substantially inward in the radial direction and a clinch located inward of the sidewall in the radial direction. A radially outer surface of the clinch intersects the carcass and the reference surface. A ratio of a sum (LA+LB) of a length LA from a point of intersection PA between the outer surface and the carcass to a point of intersection PB between the outer surface and the reference surface and a length LB from the point of intersection PB to the top, relative to the projecting length W, is equal to or greater than 0.77 and equal to or less than 0.97.

Preferably, in the pneumatic tire, a ratio of the length LA relative to the sum (LA+LB) is equal to or greater than 0.13 and equal to or less than 0.25.

According to another aspect, a pneumatic tire according to the present invention includes a tread, a pair of side pieces, a pair of beads, and a carcass. Each side piece extends from an edge of the tread substantially inward in a radial direction. Each bead is located inward of the side piece in an axial direction at a radially inner portion of the side piece. The carcass extends along inner sides of the tread and the side pieces and on and between the one bead and the other bead.

In the tire, each side piece includes a main body and a rim protector projecting from the main body outward in the axial direction. The rim protector extends in a circumferential direction. The rim protector has a first inclined surface extending from a top of the rim protector substantially outward in the radial direction and a second inclined surface extending from the top of the rim protector substantially inward in the radial direction. A profile of an outer surface of the main body is represented by a plurality of circular arcs aligned in the radial direction. These circular arcs include an outer circular arc extending substantially outward in the radial direction from a first reference position corresponding to a position at which the tire has a maximum width in the axial direction, and an inner circular arc extending substantially inward in the radial direction from the first reference position. The outer circular arc and the inner circular arc are tangent to each other at the first reference position. When each of a profile of the first inclined surface and a profile of the second inclined surface is represented by a circular arc, the circular arc that represents the profile of the first inclined surface is defined as a first circular arc, and the circular arc that represents the profile of the second inclined surface is defined as a second circular arc, the first circular arc is tangent to the outer circular arc and the second circular arc is tangent to the inner circular arc. A ratio of a thickness E of the side piece at the first reference position relative to a thickness F of the side piece at the top is equal to or greater than 0.20 and equal to or less than 0.30. A ratio of a height H in the radial direction from a bead base line of the tire to the top relative to a cross-sectional height SH of the tire is equal to or greater than 0.27 and equal to or less than 0.34.

Preferably, in the pneumatic tire, when a position on an outer surface of the tire at which position a height in the radial direction from the bead base line is 22% of the cross-sectional height SH is defined as a second reference position, a ratio of a thickness G of the side piece at the second reference position relative to the thickness F is equal to or greater than 0.40 and equal to or less than 0.60.

Preferably, in the pneumatic tire, the first inclined surface has a shape projecting outward. The second inclined surface has a shape projecting inward.

Preferably, in the pneumatic tire, a ratio of the thickness F relative to the cross-sectional height SH is equal to or greater than 0.10 and equal to or less than 0.15.

According to still another aspect, a pneumatic tire according to the present invention includes a tread, a pair of side pieces, a pair of beads, and a carcass. Each side piece extends from the tread substantially inward in a radial direction. Each bead is located inward of the side piece in an axial direction at a radially inner portion of the side piece. The carcass extends along inner sides of the tread and the side pieces and on and between the one bead and the other bead.

In the tire, each side piece includes a main body and a rim protector projecting from an outer surface of the main body outward in the axial direction. A profile of the outer surface of the main body is represented by a plurality of circular arcs aligned in the radial direction. These circular arcs include an outer circular arc extending substantially outward in the radial direction from a reference position corresponding to a position at which the tire has a maximum width in the axial direction, and an inner circular arc extending substantially inward in the radial direction from the reference position. The outer circular arc and the inner circular arc are tangent to each other at the reference position. The rim protector extends in a circumferential direction. The rim protector has a first inclined surface extending from a top of the rim protector substantially outward in the radial direction and a second inclined surface extending from the top of the rim protector substantially inward in the radial direction. When each of a profile of the first inclined surface and a profile of the second inclined surface is represented by a circular arc, the circular arc that represents the profile of the first inclined surface is defined as a first circular arc, and the circular arc that represents the profile of the second inclined surface is defined as a second circular arc. The first circular arc is tangent to the outer circular arc at a radially outer edge of the first inclined surface. The second circular arc is tangent to the inner circular arc at a radially inner edge of the second inclined surface. When a line segment connecting the radially outer edge of the first inclined surface to the radially inner edge of the second inclined surface is defined as a reference line segment, a ratio of an area of a region surrounded by the reference line segment and the outer surface of the main body relative to an area of a region surrounded by the reference line segment, the first inclined surface, and the second inclined surface is equal to or greater than 0.40 and equal to or less than 0.48.

Preferably, in the pneumatic tire, the first inclined surface has a shape projecting outward. The second inclined surface has a shape projecting inward.

Preferably, in the pneumatic tire, a ratio of a height H in the radial direction from a bead base line of the tire to the top relative to a cross-sectional height SH of the tire is equal to or greater than 0.27 and equal to or less than 0.34.

DESCRIPTION OF THE PREFERRED EMBODIMENTS

The following will describe in detail the present invention based on preferred embodiments with appropriate reference to the drawings.

First Embodiment

Figure 1:
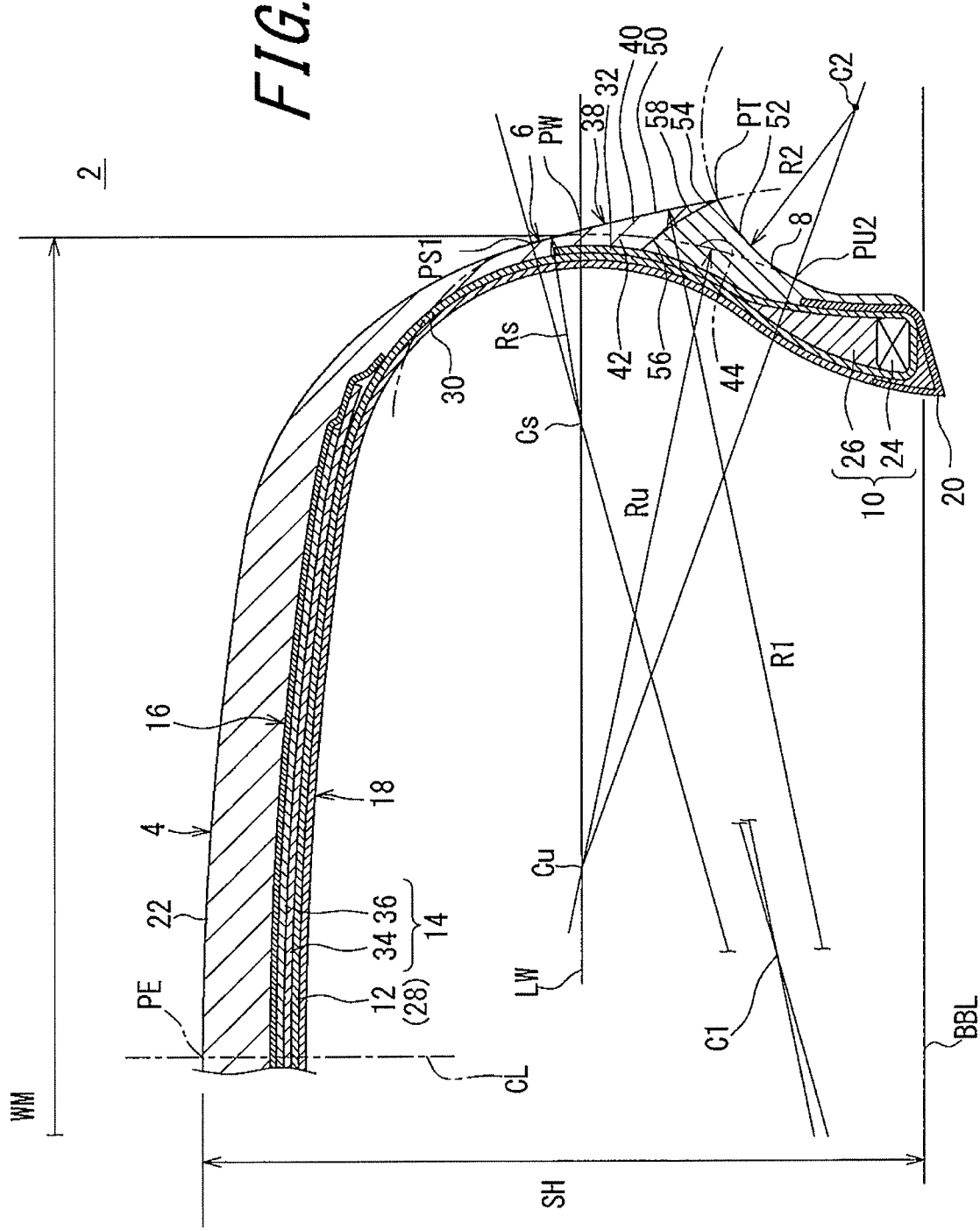
FIG. 1 is a cross-sectional view of a portion of a pneumatic tire according to an embodiment of the present invention.

FIG. 1 shows a cross-section of a pneumatic tire 2 according to a first embodiment. In FIG. 1, the up-down direction is the radial direction of the tire 2, the right-left direction is the axial direction of the tire 2, and the direction perpendicular to the surface of the sheet is the circumferential direction of the tire 2. The cross-section shown in FIG. 1 is obtained by cutting the tire 2 along a plane perpendicular to the circumferential direction.

In FIG. 1, an alternate long and short dash line CL represents the equator plane of the tire 2. The shape of the tire 2 is symmetrical about the equator plane CL except for a tread pattern.

The tire 2 includes a tread 4, a pair of sidewalls 6, a pair of clinches 8, a pair of beads 10, a carcass 12, a belt 14, a band 16, an inner liner 18, and a pair of chafers 20. The tire 2 is of a tubeless type. The tire 2 is mounted to a passenger car.

The tread 4 has a shape projecting outward in the radial direction. The tread 4 forms a tread surface 22 that is brought into contact with a road surface. The tread 4 is formed from a crosslinked rubber that is excellent in wear resistance, heat resistance, and grip performance. Although not shown, the tread pattern is formed by grooves being formed on the tread 4.

Each sidewall 6 extends from the tread 4 substantially inward in the radial direction. Although not shown, a radially outer portion of the sidewall 6 is joined to the tread 4. A radially inner portion of the sidewall 6 is joined to the clinch 8. The sidewall 6 is formed from a crosslinked rubber that is excellent in cut resistance and weather resistance. The sidewall 6 prevents the carcass 12 from being damaged.

Each clinch 8 is located inward of the sidewall 6 in the radial direction. The clinch 8 is located outward of the bead 10 and the carcass 12 in the axial direction. The clinch 8 is formed from a crosslinked rubber that is excellent in wear resistance. The clinch 8 comes into contact with a flange of a rim.

Each bead 10 is located inward of the clinch 8 in the axial direction. The bead 10 includes a core 24 and an apex 26 extending from the core 24 outward in the radial direction. The core 24 has a ring shape and includes a non-stretchable wound wire. A typical material of the wire is steel. The apex 26 is tapered outward in the radial direction. The apex 26 is formed from a highly hard crosslinked rubber.

The carcass 12 includes a carcass ply 28. The carcass ply 28 extends along the tread 4, each sidewall 6, and each clinch 8. The carcass ply 28 extends on and between the beads 10 at both sides. The carcass ply 28 is turned up around each core 24 from the inner side toward the outer side in the axial direction. Because of this turning-up, a main portion 30 and turned-up portions 32 are formed in the carcass ply 28. In the tire 2, the carcass 12 is formed of the one carcass ply 28. The carcass 12 may be formed of two or more carcass plies 28.

The carcass ply 28 includes a large number of cords aligned with each other, and a topping rubber. The absolute value of the angle of each cord relative to the equator plane CL is 75° to 90°. In other words, the carcass 12 has a radial structure. The cords are formed from an organic fiber. Examples of preferable organic fibers include polyester fibers, nylon fibers, rayon fibers, polyethylene naphthalate fibers, and aramid fibers.

The belt 14 is located inward of the tread 4 in the radial direction. The belt 14 is laminated on the carcass 12. The belt 14 reinforces the carcass 12. The belt 14 includes an inner layer 34 and an outer layer 36. As is obvious from FIG. 1, the width of the inner layer 34 is slightly larger than the width of the outer layer 36 in the axial direction. Each of the inner layer 34 and the outer layer 36 includes a large number of cords aligned with each other, and a topping rubber, which are not shown. Each cord is tilted relative to the equator plane CL. The absolute value of the tilt angle is generally equal to or greater than 10° and equal to or less than 35°. The direction in which each cord of the inner layer 34 is tilted relative to the equator plane CL is opposite to the direction in which each cord of the outer layer 36 is tilted relative to the equator plane CL. The material of the cords is preferably steel. An organic fiber may be used for the cords. The width, in the axial direction, of the belt 14 is preferably equal to or greater than 0.7 times of the maximum width of the tire 2. The belt 14 may include three or more layers.

The band 16 is located outward of the belt 14 in the radial direction. The width of the band 16 is larger than the width of the belt 14 in the axial direction. The band 16 includes a cord and a topping rubber, which are not shown. The cord is helically wound. The band 16 has a so-called jointless structure. The cord extends substantially in the circumferential direction. The angle of the cord relative to the circumferential direction is equal to or less than 5° and further equal to or less than 2°. The belt 14 is held by the cord, so that lifting of the belt 14 is suppressed. The cord is formed from an organic fiber. Examples of preferable organic fibers include nylon fibers, polyester fibers, rayon fibers, polyethylene naphthalate fibers, and aramid fibers.

The belt 14 and the band 16 form a reinforcing layer. The reinforcing layer may be composed of only the belt 14. The reinforcing layer may be composed of only the band 16.

The inner liner 18 is located inward of the carcass 12. The inner liner 18 is joined to the inner surface of the carcass 12. The inner liner 18 is formed from a crosslinked rubber that is excellent in air blocking property. A typical base rubber of the inner liner 18 is an isobutylene-isoprene-rubber or a halogenated isobutylene-isoprene-rubber. The inner liner 18 maintains the internal pressure of the tire 2.

Each chafer 20 is located in the vicinity of the bead 10. When the tire 2 is mounted onto the rim, the chafer 20 comes into contact with the rim. Because of this contact, the vicinity of the bead 10 is protected. In this embodiment, the chafer 20 includes a fabric and a rubber with which the fabric is impregnated. The chafer 20 may be integrated with the clinch 8. In this case, the material of the chafer 20 is the same as the material of the clinch 8.

In the present invention, a portion of the tire 2 at the axially outer side of the carcass 12 and from each sidewall 6 to each clinch 8 is referred to as a side piece 38. The side piece 38 includes the sidewall 6 and the clinch 8. In the tire 2, the side piece 38 is composed of the sidewall 6 and the clinch 8.

As described above, each sidewall 6 extends from the tread 4 substantially inward in the radial direction. Each clinch 8 is located inward of the sidewall 6 in the radial direction. Each side piece 38 of the tire 2 extends from the tread 4 substantially inward in the radial direction.

As is obvious from FIG. 1, the clinch 8 forms a radially inner portion of the side piece 38. As described above, each bead 10 is located inward of the clinch 8 in the axial direction. At the radially inner portion of the side piece 38, the bead 10 of the tire 2 is located inward of the side piece 38 in the axial direction.

In the tire 2, each side piece 38 includes a rim protector 40. The rim protector 40 extends in the circumferential direction. Specifically, each side piece 38 includes a main body 42 and the rim protector 40 extending in the circumferential direction. The rim protector 40 is located outward of the main body 42 in the axial direction. The rim protector 40 projects from an outer surface 44 of the main body 42 outward in the axial direction. In the present invention, the outer surface 44 of the main body 42 is a reference surface of the side piece 38. That is, the rim protector 40 projects from the reference surface 44 of the side piece 38 outward in the axial direction.

In FIG. 1, reference character PT indicates a top of the rim protector 40. The top PT is represented by a position at which a height from the reference surface 44 is maximum. The height from the reference surface 44 is obtained by measuring the length from the reference surface 44 to the outer surface of the rim protector 40 along a line normal to the reference surface 44 in the cross-section shown in FIG. 1.

In the present invention, each of the contours of the tire 2 and the components forming the tire 2, including the outer surface 44 (i.e., the reference surface 44) of the main body 42 described above and a boundary described later, is referred to as a profile. The profile is determined on the basis of dimensions measured in a state where the tire 2 is mounted on a normal rim and inflated with air to a normal internal pressure, unless otherwise specified. During the measurement of the dimensions for profile determination, no load is applied to the tire 2. In the case where grooves are formed on the tread 4, the profile of the tread surface 22 is represented by a virtual outer surface obtained by assuming that the grooves are not present. In the case where a recessed and projecting pattern is provided on the side piece 38, the profile of the outer surface of the side piece 38 is represented by a virtual outer surface obtained assuming that the recessed and projecting pattern is not present. The dimensions and angles of each component of the tire 2 are also measured in the same manner as for the dimensions for profile determination. In the case where the tire 2 is designed for a passenger car, the dimensions and angles are measured in a state where the internal pressure is 180 kPa, unless otherwise specified.

In the present specification, the normal rim means a rim specified in a standard on which the tire 2 is based. The "standard rim" in the JATMA standard, the "Design Rim" in the IRA standard, and the "Measuring Rim" in the ETRTO standard are normal rims.

In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

In the present specification, a normal load means a load specified in the standard on which the tire 2 is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRO standard are normal loads.

In FIG. 1, reference character PE indicates the point of intersection between the tread surface 22 and the equator plane CL. In the present invention, the point of intersection PE is referred to as an equator. A solid line BBL is a bead base line. The bead base line BBL is a line that defines the rim diameter (see the JATAM standard.) of the rim. The bead base line BBL extends in the axial direction. A double-headed arrow SH represents the height in the radial direction from the bead base line BBL to the equator PE of the tire 2. The height SH is a cross-sectional height of the tire 2.

Figure 2:
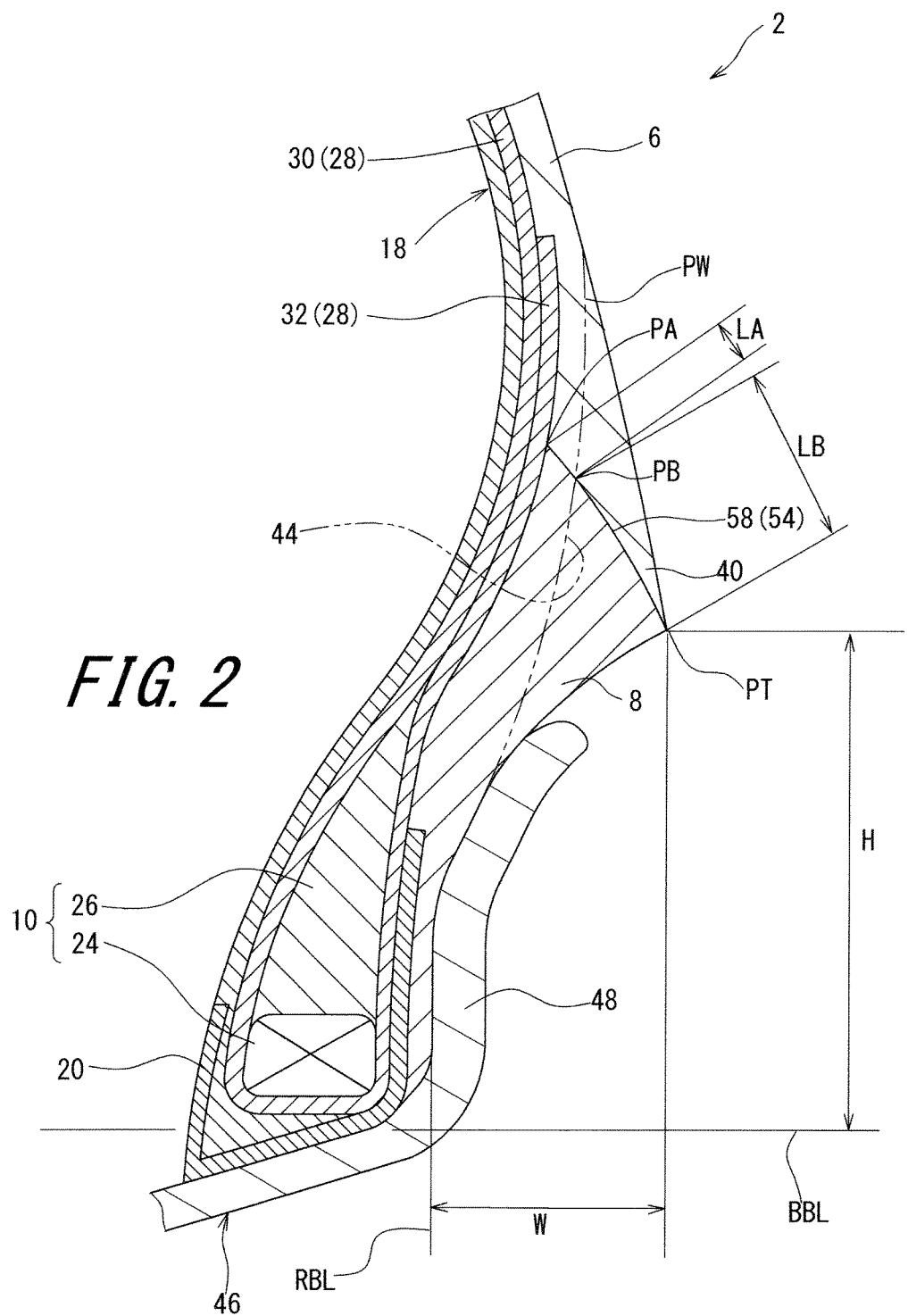
FIG. 2 is an enlarged cross-sectional view of a portion of the tire in FIG. 1.

FIG. 2 shows a rim protector 40 portion of the tire 2 shown in FIG. 1, together with a rim 46. The rim 46 is a normal rim. In FIG. 2, a double-headed arrow H represents the height in the radial direction from the bead base line BBL to the top PT of the rim protector 40. In FIG. 2, a solid line RBL is a rim base line. The rim base line RBL is a line that defines the rim width (see the JATAM standard.) of the rim 46. The rim base line RBL extends in the radial direction. A double-headed arrow W represents the length in the axial direction from the rim base line RBL to the top PT of the rim protector 40. The length W is the projecting length of the rim protector 40.

In the tire 2, the ratio of the height H relative to the cross-sectional height SH is equal to or greater than 0.27. By this ratio being set to be equal to or greater than 0.27, the rim protector 40 is prevented from interfering with a flange 48 of the rim 46. The tire 2 is appropriately mounted onto the rim 46. The volume of the rim protector 40 is appropriately maintained. Thus, in the tire 2, the influence of the rim protector 40 on the weight thereof is suppressed.

In the tire 2, the ratio of the height H relative to the cross-sectional height SH is equal to or less than 0.34. By this ratio being set to be equal to or less than 0.34, the rim protector 40 effectively serves to prevent damage of the flange 48 or the sidewall 6. A top PT portion of the rim protector 40 effectively contributes to the stiffness of a bead 10 portion. Thus, in the tire 2, the lateral stiffness thereof can be enhanced. Furthermore, movement of the bead 10 portion is effectively suppressed. Thus, in the tire 2, an increase in the rolling resistance thereof is suppressed.

In the tire 2, the projecting length W is equal to or greater than 12 mm. By the projecting length W being set to be equal to or greater than 12 mm, the rim protector 40 effectively serves to prevent damage of the flange 48 or the sidewall 6. The top PT portion of the rim protector 40 effectively contributes to the stiffness of the bead 10 portion. Thus, in the tire 2, the lateral stiffness thereof can be enhanced. Furthermore, movement of the bead 10 portion is effectively suppressed. Thus, in the tire 2, an increase in the rolling resistance thereof is suppressed.

In the tire 2, the projecting length W is equal to or less than 18 mm. By the projecting length W being set to be equal to or less than 18 mm, the volume of the rim protector 40 is appropriately maintained. In the tire 2, the influence of the rim protector 40 on the weight thereof is suppressed. Furthermore, the influence of the rim protector 40 on the stiffness is suppressed. Thus, with the tire 2, favorable ride comfort is maintained.

As described above, the rim protector 40 projects from the reference surface 44 of the side piece 38 outward in the axial direction. In FIG. 1, reference character PW represents a specific position on the reference surface 44. On the profile of the tire 2, the width in the axial direction is maximum at the position PW. In the tire 2, a length WM in the axial direction between the right and left reference surfaces 44 at the position PW is represented as the maximum width (also referred to as cross-sectional width) of the tire 2. In other words, the position PW corresponds to a position at which the tire 2 has the maximum width WM. In the present invention, the position PW is also referred to as a reference position. In FIG. 1, a solid line LW is a straight line that passes through the reference position PW and extends in the axial direction.

In the tire 2, the profile of the reference surface 44 includes a plurality of circular arcs. In the present invention, these circular arcs include a circular arc (hereinafter, referred to as an outer circular arc) extending from the reference position PW substantially outward in the radial direction and a circular arc (hereinafter, referred to as an inner circular arc) extending from the reference position PW substantially inward in the radial direction.

In FIG. 1, an arrow Rs represents the radius of curvature of the outer circular arc. An arrow Ru represents the radius of curvature of the inner circular arc. Reference character Cs indicates the center of the outer circular arc, and reference character Cu indicates the center of the inner circular arc. As shown in FIG. 1, the center Cs of the outer circular arc and the center Cu of the inner circular arc are located on the straight line LW. In the tire 2, the outer circular arc and the inner circular arc are tangent to each other at the reference position PW.

In the tire 2, the outer circular arc has a shape projecting outward. The inner circular arc has a shape projecting outward. The reference surface 44 includes the outer circular arc and the inner circular arc, and the outer circular arc and the inner circular arc are tangent to each other at the reference position PW. As described above, the reference position PW corresponds to the position at which the tire 2 has the maximum width WM. The reference surface 44 has a shape projecting outward in the axial direction. In the tire 2, the side piece 38 having the reference surface 44 contributes to bending.

In the tire 2, in light of appropriate bending and support of a load, the radius of curvature Rs of the outer circular arc is preferably equal to or greater than 30 mm and equal to or less than 40 mm. The radius of curvature Ru of the inner circular arc is preferably equal to or greater than 45 mm and equal to or less than 55 mm. The radius of curvature Ru of the inner circular arc is more preferably larger than the radius of curvature Rs of the outer circular arc. Further preferably, the ratio of the radius of curvature Ru of the inner circular arc relative to the radius of curvature Rs of the outer circular arc is equal to or greater than 1.38 and equal to or less than 1.48.

In the tire 2, the rim protector 40 has a first inclined surface 50 and a second inclined surface 52. The first inclined surface 50 is a portion of the outer surface of the rim protector 40. The first inclined surface 50 extends from the top PT of the rim protector 40 substantially outward in the radial direction. The second inclined surface 52 is also a portion of the outer surface of the rim protector 40. The second inclined surface 52 extends from the top PT of the rim protector 40 substantially inward in the radial direction. In the cross-section shown in FIG. 1, the rim protector 40 has a shape spreading from the top PT toward the reference surface 44.

In the tire 2, the profile of the first inclined surface 50 is represented by a circular arc. In the present invention, the circular arc that represents the profile of the first inclined surface 50 is referred to as a first circular arc. In the tire 2, the profile of the second inclined surface 52 is also represented by a circular arc. In the present invention, the circular arc that represents the profile of the second inclined surface 52 is referred to as a second circular arc. In FIG. 1, an arrow R1 represents the radius of curvature of the first circular arc, and an arrow R2 represents the radius of curvature of the second circular arc. Reference character C1 indicates the center of the first circular arc, and reference character C2 indicates the center of the second circular arc.

In the tire 2, at a position PS1, the first circular arc is tangent to the outer circular arc. The position PS1 is the tangent point between the first circular arc and the outer circular arc. At a position PU2, the second circular arc is tangent to the inner circular arc. The position PU2 is the tangent point between the second circular arc and the inner circular arc. The center C1, the center Cs, and the position PS1 are located on the same straight line, which is not appropriately represented because of the drawing space.

As described above, in the tire 2, each of the profiles of the first inclined surface 50 and the second inclined surface 52 is represented by the circular arc. In addition, the first circular arc is tangent to the outer circular arc, and the second circular arc is tangent to the inner circular arc. Thus, the thickness of the rim protector 40 gradually increases from the position PS1 toward the top PT, and gradually decreases from the top PT toward the position PU2. In the rim protector 40 of the tire 2, a portion having a thickness larger than necessary is less likely to be formed. In the tire 2, the influence of the rim protector 40 on the weight of the tire 2 is reduced to be small. The influence of the rim protector 40 on the stiffness of the tire 2 is also not specific. The rim protector 40 effectively enhances the lateral stiffness of the tire 2 while suppressing an increase in the weight of the tire 2. In particular, in the case where the tire 2 has an aspect ratio equal to or less than 50%, the effect of the rim protector 40 can be effectively exerted. The aspect ratio is represented by the ratio of the cross-sectional height SH relative to the cross-sectional width WM.

As described above, in the tire 2, the ratio of the height H to the top PT of the rim protector 40 relative to the cross-sectional height SH is equal to or greater than 0.27 and equal to or less than 0.34, and the projecting length W of the rim protector 40 is equal to or greater than 12 mm and equal to or less than 18 mm. Thus, even when the tire 2 is mounted onto a rim 46 having a largest size among a plurality of applicable rims 46 (also referred to as allowable rims) specified in the standard on which the tire 2 is based, the rim protector 40 effectively prevents damage of the sidewall 6 or the flange 48. In addition, even when the tire 2 is mounted onto a rim 46 having a smallest size among the plurality of applicable rims 46, interference of the rim protector 40 with the flange 48 is effectively is prevented, so that the tire 2 can be appropriately mounted onto the rim 46. Even when the tire 2 is mounted onto any applicable rim 46, the rim protector 40 sufficiently serves to prevent damage of the sidewall 6 or the flange 48. Furthermore, as described above, the rim protector 40 of the tire 2 contributes to enhancement of the stiffness of the tire 2 while suppressing an increase in the weight of the tire 2. According to the present invention, the pneumatic tire 2 that has the rim protector 40 capable of sufficiently exerting its function and has enhanced stiffness while an increase in the weight of the tire 2 is suppressed, is obtained.

In the tire 2, the first circular arc, which represents the profile of the first inclined surface 50, is a circular arc projecting outward. In other words, the first inclined surface 50 has a shape projecting outward. The second circular arc, which represents the profile of the second inclined surface 52, is a circular arc projecting inward. In other words, the second inclined surface 52 has a shape projecting inward. While formation of a portion having a thickness larger than necessary is suppressed, the rim protector 40 having the first inclined surface 50 and the second inclined surface 52 effectively contributes to ensuring a desired thickness over a wide range from the position PS1 to the position PU2, that is, from the maximum width position PW of the tire 2 to a position at which the tire 2 is brought into contact with the rim 46. The rim protector 40 further contributes to enhancement of the stiffness while effectively suppressing an increase in the weight. Furthermore, the rim protector 40 more effectively suppresses movement of the bead 10 portion. Thus, in the tire 2, an increase in the rolling resistance thereof is further suppressed. From this standpoint, in the present invention, as in the tire 2 shown in FIG. 1, preferably, the first inclined surface 50 has a shape projecting outward, and the second inclined surface 52 has a shape projecting inward.

In the tire 2, the ratio of the radius of curvature R2 of the second circular arc relative to the radius of curvature R1 of the first circular arc is preferably equal to or greater than 0.066. By this ratio being set to be equal to or greater than 0.066, the rim protector 40 in which the thickness from the reference surface 44 to the first inclined surface 50 is appropriately maintained is obtained. The rim protector 40 serves to prevent damage of the sidewall 6 or the flange 48 and also contributes to enhancement of the stiffness. Entrainment of air caused by the second inclined surface 52 is suppressed, so that occurrence of a molding failure is prevented.

In the tire 2, the ratio of the radius of curvature R2 of the second circular arc relative to the radius of curvature R1 of the first circular arc is preferably equal to or less than 0.117. By this ratio being set to be equal to or less than 0.117, the rim protector 40 maintained with an appropriate thickness is obtained. In the tire 2, the influence of the rim protector 40 on the weight thereof is effectively suppressed.

In the tire 2, the radius of curvature R1 of the first circular arc is preferably equal to or greater than 150 mm and is preferably equal to or less than 450 mm. By the radius of curvature R1 being set to be equal to or greater than 150 mm, the rim protector 40 in which the thickness from the reference surface 44 to the first inclined surface 50 is appropriately maintained is obtained. In the tire 2, the influence of the rim protector 40 on the weight thereof is effectively suppressed. The rim protector 40 having the first inclined surface 50 that is substantially flat is obtained. Thus, even when a plurality of tires 2 are piled up and stored, collapse of the tires 2 is less likely to occur. From this standpoint, the radius of curvature R1 is more preferably equal to or greater than 250 mm. By the radius of curvature R1 being set to be equal to or less than 450 mm, the rim protector 40 in which the thickness from the reference surface 44 to the first inclined surface 50 is appropriately maintained is obtained. The rim protector 40 serves to prevent damage of the sidewall 6 or the flange 48 and also contributes to enhancement of the stiffness. From this standpoint, the radius of curvature R1 is more preferably equal to or less than 380 mm.

In the tire 2, the radius of curvature R2 of the second circular arc is preferably equal to or greater than 15 mm and is preferably equal to or less than 40 mm. By the radius of curvature R2 being set to be equal to or greater than 15 mm, entrainment of air caused by the second inclined surface 52 is suppressed. In the tire 2, occurrence of a molding failure is prevented. In particular, for the tire 2, during molding thereof, when a rubber flows into a recess for the rim protector 40 which recess is provided to a mold (not shown), an appearance defective (also referred to as air trim) occurring due to the rubber entrapping air is prevented. From this standpoint, the radius of curvature R2 is more preferably equal to or greater than 20 mm. By the radius of curvature R2 being set to be equal to or less than 40 mm, the rim protector 40 in which the thickness from the reference surface 44 to the second inclined surface 52 is appropriately maintained is obtained. In the tire 2, the influence of the rim protector 40 on the weight thereof is effectively suppressed. From this standpoint, the radius of curvature R2 is more preferably equal to or less than 35 m.

In the tire 2, the radius of curvature R1 of the first circular arc is larger than the radius of curvature Rs of the outer circular arc. Thus, the rim protector 40 in which the thickness from the reference surface 44 to the first inclined surface 50 is appropriately maintained is obtained. The rim protector 40 serves to prevent damage of the sidewall 6 or the flange 48 and also contributes to enhancement of the stiffness. From this standpoint, the ratio of the radius of curvature R1 relative to the radius of curvature Rs is preferably equal to or greater than 2 and more preferably equal to or greater than 3. From the standpoint that the rim protector 40 in which the thickness from the reference surface 44 to the first inclined surface 50 is appropriately maintained is obtained, and the influence of the rim protector 40 on the weight is suppressed, the ratio of the radius of curvature R1 relative to the radius of curvature Rs is preferably equal to or less than 10 and more preferably equal to or less than 9.

As described above, the side piece 38 of the tire 2 is composed of the sidewall 6 and the clinch 8. A boundary 54 between the sidewall 6 and the clinch 8 is a radially inner surface 56 of the sidewall 6 and is a radially outer surface 58 of the clinch 8. The side piece 38 is laminated on the carcass 12. Thus, the boundary 54 intersects the carcass 12. The boundary 54 extends substantially outward in the axial direction from the point of intersection with the carcass 12. As shown in FIG. 1, the boundary 54 intersects the outer surface of the rim protector 40 at the top PT. The boundary 54 may intersect the outer surface of the rim protector 40 at a portion outward of the top PT in the radial direction. The boundary 54 may intersect the outer surface of the rim protector 40 at a portion inward of the top PT in the radial direction.

In the tire 2, the radially outer surface 58 of the clinch 8 intersects the carcass 12 and the reference surface 44. In FIG. 2, reference character PA represents the point of intersection between the outer surface 58 and the carcass 12. Reference character PB represents the point of intersection between the outer surface 58 and the reference surface 44. A double-headed arrow LA represents the length from the point of intersection PA to the point of intersection PB. A double-headed arrow LB represents the length from the point of intersection PB to the top PT.

The sum (LA+LB) of the length LA and the length LB substantially corresponds to the length from the carcass 12 to the top PT of the rim protector 40. Similarly to the projecting length W of the rim protector 40, the sum (LA+LB) influences the position of the top PT, that is, the shape of the rim protector 40.

In the tire 2, the rim protector 40 is formed by the sidewall 6 and the clinch 8. In general, the sidewall 6 is more flexible than the clinch 8, and the clinch 8 is harder than the sidewall 6. Since the rim protector 40 includes the flexible sidewall 6 and the hard clinch 8, the sum (LA+LB) also influences the stiffness of the rim protector 40.

In the tire 2, the ratio of the sum (LA+LB) relative to the projecting length W is preferably equal to or greater than 0.77 and is preferably equal to or less than 0.97. Thus, the influence of the rim protector 40 on the weight and the influence of the rim protector 40 on the stiffness are effectively balanced. Furthermore, even when the tire 2 is mounted onto any applicable rim 46, the rim protector 40 serves to prevent damage of the sidewall 6 or the flange 48. With the rim protector 40, while its function is maintained, the stiffness can be effectively enhanced with an increase in the weight suppressed. From this standpoint, this ratio is more preferably equal to or greater than 0.80 and is more preferably equal to or less than 0.93.

In the tire 2, the ratio of the length LA relative to the sum (LA+LB) is preferably equal to or greater than 0.13 and is preferably equal to or less than 0.25. Thus, the influence of the rim protector 40 on the weight and the influence of the rim protector 40 on the stiffness are more effectively balanced. Furthermore, even when the tire 2 is mounted onto any applicable rim 46, the rim protector 40 sufficiently serves to prevent damage of the sidewall 6 or the flange 48. With the rim protector 40, while its function is sufficiently maintained, the stiffness can be more effectively enhanced with an increase in the weight suppressed further. From this standpoint, this ratio is more preferably equal to or greater than 0.16 and is more preferably equal to or less than 0.22.

Second Embodiment

Figure 3:
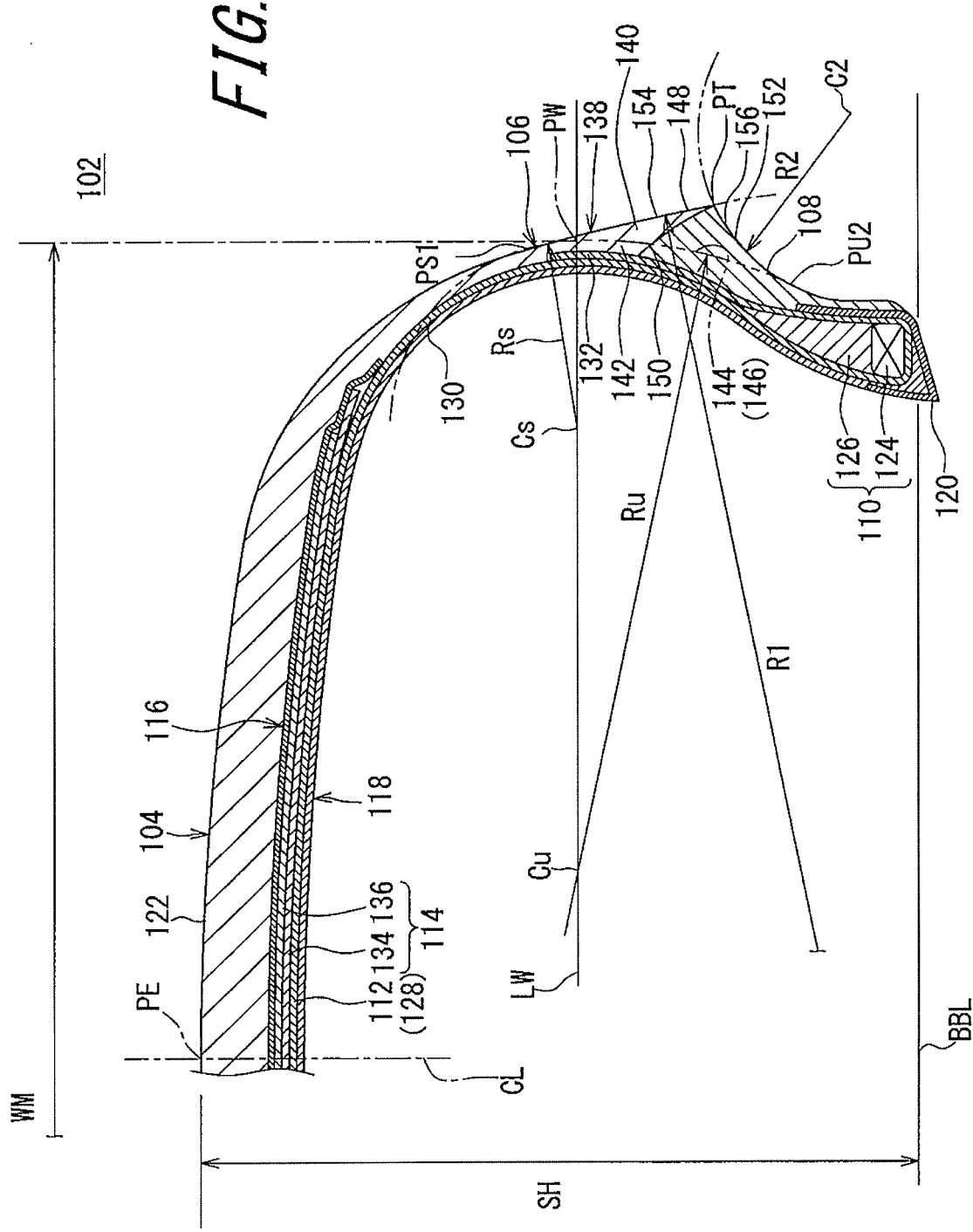
FIG. 3 is a cross-sectional view of a portion of a pneumatic tire according to another embodiment of the present invention.

FIG. 3 shows a cross-section of a pneumatic tire 102 according to a second embodiment. In FIG. 3, the up-down direction is the radial direction of the tire 102, the right-left direction is the axial direction of the tire 102, and the direction perpendicular to the surface of the sheet is the circumferential direction of the tire 102. The cross-section shown in FIG. 3 is obtained by cutting the tire 102 along a plane perpendicular to the circumferential direction.

In FIG. 3, an alternate long and short dash line CL represents the equator plane of the tire 102. The shape of the tire 102 is symmetrical about the equator plane CL except for a tread pattern.

The tire 102 includes a tread 104, a pair of sidewalls 106, a pair of clinches 108, a pair of beads 110, a carcass 112, a belt 114, a band 116, an inner liner 118, and a pair of chafers 120. The tire 102 is of a tubeless type. The tire 102 is mounted to a passenger car.

The tread 104 has a shape projecting outward in the radial direction. The tread 104 forms a tread surface 122 that is brought into contact with a road surface. The tread 104 is formed from a crosslinked rubber that is excellent in wear resistance, heat resistance, and grip performance. Although not shown, grooves can be formed on the tread 104. Accordingly, the tread pattern is formed.

Each sidewall 106 extends from the tread 104 substantially inward in the radial direction. Although not shown, a radially outer portion of the sidewall 106 is joined to the tread 104. A radially inner portion of the sidewall 106 is joined to the clinch 108. The sidewall 106 is formed from a crosslinked rubber that is excellent in cut resistance and weather resistance. The sidewall 106 prevents the carcass 112 from being damaged.

Each clinch 108 is located inward of the sidewall 106 in the radial direction. The clinch 108 is located outward of the bead 110 and the carcass 112 in the axial direction. The clinch 108 is formed from a crosslinked rubber that is excellent in wear resistance. The clinch 108 comes into contact with a flange of a rim.

Each bead 110 is located inward of the clinch 108 in the axial direction. The bead 110 includes a core 124 and an apex 126 extending from the core 124 outward in the radial direction. The core 124 has a ring shape and includes a non-stretchable wound wire. A typical material of the wire is steel. The apex 126 is tapered outward in the radial direction. The apex 126 is formed from a highly hard crosslinked rubber.

The carcass 112 includes a carcass ply 128. The carcass ply 128 extends along the tread 104, each sidewall 106, and each clinch 108. The carcass ply 128 extends on and between the beads 110 at both sides. The carcass ply 128 is turned up around each core 124 from the inner side toward the outer side in the axial direction. Because of this turning-up, a main portion 130 and turned-up portions 132 are formed in the carcass ply 128. In the tire 102, the carcass 112 is formed of the one carcass ply 128. The carcass 112 may be formed of two or more carcass plies 128.

The carcass ply 128 includes a large number of cords aligned with each other, and a topping rubber, which are not shown. The absolute value of the angle of each cord relative to the equator plane CL is 75° to 90°. In other words, the carcass 112 has a radial structure. The cords are formed from an organic fiber. Examples of preferable organic fibers include polyester fibers, nylon fibers, rayon fibers, polyethylene naphthalate fibers, and aramid fibers.

The belt 114 is located inward of the tread 104 in the radial direction. The belt 114 is laminated on the carcass 112. The belt 114 reinforces the carcass 112. The belt 114 includes an inner layer 134 and an outer layer 136. As is obvious from FIG. 3, the width of the inner layer 134 is slightly larger than the width of the outer layer 136 in the axial direction.

Each of the inner layer 134 and the outer layer 136 includes a large number of cords aligned with each other, and a topping rubber, which are not shown. Each cord is tilted relative to the equator plane CL. The absolute value of the tilt angle is generally equal to or greater than 30° and equal to or less than 35°. The direction in which each cord of the inner layer 134 is tilted relative to the equator plane CL is opposite to the direction in which each cord of the outer layer 136 is tilted relative to the equator plane CL. The material of the cords is preferably steel. An organic fiber may be used for the cords. The width, in the axial direction, of the belt 114 is preferably equal to or greater than 0.7 times of the maximum width of the tire 102. The belt 114 may include three or more layers.

The band 116 is located outward of the belt 114 in the radial direction. The width of the band 116 is larger than the width of the belt 114 in the axial direction. The band 116 covers the entirety of the belt 114.

The band 116 includes a cord and a topping rubber, which are not shown. The cord is helically wound. The band 116 has a so-called jointless structure. The cord extends substantially in the circumferential direction. The angle of the cord relative to the circumferential direction is equal to or less than 5° and further equal to or less than 2°. The belt 114 is held by the cord, so that lifting of the belt 114 is suppressed. The cord is formed from an organic fiber. Examples of preferable organic fibers include nylon fibers, polyester fibers, rayon fibers, polyethylene naphthalate fibers, and aramid fibers.

The belt 114 and the band 116 form a reinforcing layer. The reinforcing layer may be composed of only the belt 114. The reinforcing layer may be composed of only the band 116.

The inner liner 118 is located inward of the carcass 112. The inner liner 118 is joined to the inner surface of the carcass 112. The inner liner 118 is formed from a crosslinked rubber that is excellent in air blocking property. A typical base rubber of the inner liner 118 is an isobutylene-isoprene-rubber or a halogenated isobutylene-isoprene-rubber. The inner liner 118 maintains the internal pressure of the tire 102.

Each chafer 120 is located in the vicinity of the bead 110. When the tire 102 is mounted onto the rim, the chafer 120 comes into contact with the rim. Because of this contact, the vicinity of the bead 110 is protected. In this embodiment, the chafer 120 includes a fabric and a rubber with which the fabric is impregnated. The chafer 120 may be integrated with the clinch 108. In this case, the material of the chafer 120 is the same as the material of the clinch 108.

In the present invention, a portion of the tire 102 at the axially outer side of the carcass 112 and from each sidewall 106 to each clinch 108 is referred to as a side piece 138. The side piece 138 includes the sidewall 106 and the clinch 108. In the tire 102, the side piece 138 is composed of the sidewall 106 and the clinch 108.

As described above, each sidewall 106 extends from the tread 104 substantially inward in the radial direction. Each clinch 108 is located inward of the sidewall 106 in the radial direction. Each side piece 138 of the tire 102 extends from the tread 104 substantially inward in the radial direction.

As is obvious from FIG. 3, the clinch 108 forms a radially inner portion of the side piece 138. As described above, each bead 110 is located inward of the clinch 108 in the axial direction. At the radially inner portion of the side piece 138, the bead 110 of the tire 102 is located inward of the side piece 138 in the axial direction.

The aspect ratio (see the JATAM standard.) of the tire 102 is equal to or less than 50%. Specifically, the aspect ratio of the tire 102 is 45%. The tire 102 is of a low-flattening type. A rim protector 140 is provided in each side piece 138 of the tire 102. In other words, in the tire 102, each side piece 138 includes the rim protector 140. The rim protector 140 extends in the circumferential direction. Specifically, each side piece 138 includes a main body 142 and the rim protector 140 extending in the circumferential direction. The rim protector 140 is located outward of the main body 142 in the axial direction. The rim protector 140 projects from an outer surface 144 of the main body 142 outward in the axial direction. In the present invention, the outer surface 144 of the main body 142 is also referred to as a reference surface 146 of the side piece 138.

In FIG. 3, reference character PT indicates a top of the rim protector 140. The top PT is represented by a position at which a height from the reference surface 146 is maximum. The height from the reference surface 146 is obtained by measuring the length from the reference surface 146 to an outer surface 148 of the rim protector 140 along a line normal to the reference surface 146 in the cross-section shown in FIG. 3.

As described above, the side piece 138 of the tire 102 is composed of the sidewall 106 and the clinch 108. A boundary 150 between the sidewall 106 and the clinch 108 is a radially inner surface 56 of the sidewall 106 and is a radially outer surface of the clinch 108. The side piece 138 is laminated on the carcass 112. Thus, the boundary 150 intersects the carcass 112. The boundary 150 extends substantially outward in the axial direction from the point of intersection with the carcass 112. As shown in FIG. 3, the boundary 150 intersects the outer surface 148 of the rim protector 140 at the top PT. The boundary 150 may intersect the outer surface 148 of the rim protector 140 at a portion outward of the top PT in the radial direction. The boundary 150 may intersect the outer surface 148 of the rim protector 140 at a portion inward of the top PT in the radial direction.

In the present invention, each of the contours of the tire 102 and the components forming the tire 102 is referred to as a profile. The profile is specified on the basis of dimensions measured in a state where the tire 102 is mounted on a normal rim and inflated with air to a normal internal pressure, unless otherwise specified. During the measurement of the dimensions for profile specification, no load is applied to the tire 102. In the case where grooves are formed on the tread 104, a profile of the tread surface 122 is specified by a virtual outer surface obtained by assuming that the grooves are not present. In the case where a recessed and projecting pattern is provided on the side piece 138, the profile of an outer surface 152 of the side piece 138 is specified by a virtual outer surface obtained assuming that the recessed and projecting pattern is not present. The profile of the outer surface 144 of the main body 142 described above is specified by a virtual outer surface obtained by assuming that the rim protector 140 is not present in the side piece 138. Similarly to the dimensions for profile specification, the dimensions and angles of each component of the tire 102 are also measured in a state where the tire 102 is mounted on a normal rim and inflated with air to a normal internal pressure, unless otherwise specified. During the measurement, no load is applied to the tire 102. In the case where the tire 102 is designed for a passenger car, the dimensions and angles are measured in a state where the internal pressure is 180 kPa, unless otherwise specified.

In the present specification, the normal rim means a rim specified in a standard on which the tire 102 is based. The "standard rim" in the JATMA standard, the "Design Rim" in the TRA standard, and the "Measuring Rim" in the ETRTO standard are normal rims.

In the present specification, the normal internal pressure means an internal pressure specified in the standard on which the tire 102 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

In the present specification, a normal load means a load specified in the standard on which the tire 102 is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRO standard are normal loads.

In FIG. 3, reference character PW represents a specific position on the outer surface 144 of the main body 142, that is, on the reference surface 146. In the tire 102, the distance in the axial direction between the right and left reference surfaces 146 is maximum at the position PW. In the present invention, the distance WM in the axial direction between the right and left reference surfaces 146 at the position PW is represented as the maximum width (also referred to as cross-sectional width) of the tire 102. In other words, the position PW corresponds to a position at which the tire 102 has the maximum width WM, in the axial direction. In the present invention, the position PW is also referred to as a first reference position. In FIG. 3, a solid line LW is a straight line that passes through the first reference position PW and extends in the axial direction.

In the tire 102, the profile of the reference surface 146 is represented by a plurality of circular arcs aligned in the radial direction. In other words, the profile of the reference surface 146 includes a plurality of circular arcs aligned in the radial direction. In the present invention, these circular arcs includes a circular arc (hereinafter, referred to as an outer circular arc) extending from the first reference position PW substantially outward in the radial direction and a circular arc (hereinafter, referred to as an inner circular arc) extending from the first reference position PW substantially inward in the radial direction.

In FIG. 3, an arrow Rs represents the radius of curvature of the outer circular arc. An arrow Ru represents the radius of curvature of the inner circular arc. Reference character Cs indicates the center of the outer circular arc, and reference character Cu indicates the center of the inner circular arc. As shown in FIG. 3, the center Cs of the outer circular arc and the center Cu of the inner circular arc are located on the straight line LW. In the tire 102, the outer circular arc and the inner circular arc are tangent to each other at the first reference position PW. The first reference position PW is the tangent point between the outer circular arc and the inner circular arc.

In the tire 102, the outer circular arc has a shape projecting outward. The inner circular arc has a shape projecting outward. The profile of the reference surface 146, that is, of the outer surface 144 of the main body 142 include an outer circular arc and an inner circular arc, and the outer circular arc and the inner circular arc are tangent to each other at the reference position PW. As described above, the reference position PW corresponds to the position at which the tire 102 has the maximum width WM. The reference surface 146 has a shape projecting outward in the axial direction. The side piece 138 having the reference surface 146 contributes to bending.

In the tire 102, in light of appropriate bending and support of a vehicle weight, the radius of curvature Rs of the outer circular arc is preferably equal to or greater than 30 mm and equal to or less than 40 mm. The radius of curvature Ru of the inner circular arc is preferably equal to or greater than 45 mm and equal to or less than 55 mm. In the tire 102, the radius of curvature Ru of the inner circular arc is preferably larger than the radius of curvature Rs of the outer circular arc. Specifically, the ratio of the radius of curvature Ru of the inner circular arc relative to the radius of curvature Rs of the outer circular arc is preferably equal to or greater than 1.38 and equal to or less than 1.48.

In the tire 102, the rim protector 140 has a first inclined surface 154 and a second inclined surface 156. The first inclined surface 154 is a portion of the outer surface 148 of the rim protector 140. The first inclined surface 154 extends from the top PT of the rim protector 140 substantially outward in the radial direction. The second inclined surface 156 is also a portion of the outer surface 148 of the rim protector 140. The second inclined surface 156 extends from the top PT of the rim protector 140 substantially inward in the radial direction. In the cross-section shown in FIG. 3, the rim protector 140 has a shape spreading from the top PT toward the reference surface 146.

In the tire 102, the profile of the first inclined surface 154 is represented by a circular arc. In the present invention, the circular arc that represents the profile of the first inclined surface 154 is referred to as a first circular arc. In the tire 102, the profile of the second inclined surface 156 is also represented by a circular arc. In the present invention, the circular arc that represents the profile of the second inclined surface 156 is referred to as a second circular arc. In FIG. 3, an arrow R1 represents the radius of curvature of the first circular arc, and an arrow R2 represents the radius of curvature of the second circular arc. In FIG. 3, the center of the first circular arc is not shown, but reference character C2 indicates the center of the second circular arc.

In FIG. 3, a position PS1 is the radially outer edge of the rim protector 140. In the tire 102, at the position PS1, the first circular arc is tangent to the outer circular arc. The position PS1 is the tangent point between the first circular arc and the outer circular arc. In the tire 102, the position PS1, the center Cs of the outer circular arc, and the center (not shown) of the first circular arc are located on the same straight line.

In the tire 102, the rim protector 140 is configured such that the thickness thereof gradually increases from the outer edge PS1 toward the top PT. In the tire 102, in a portion outward of the top PT of the rim protector 140 in the radial direction, the thickness of the side piece 138 increases toward the inner side in the radial direction.

In FIG. 3, a position PU2 is the radially inner edge of the rim protector 140. In the tire 102, at the position PU2, the second circular arc is tangent to the inner circular arc. The position PU2 is the tangent point between the second circular arc and the inner circular arc. In the tire 102, the position PU2, the center Cu of the inner circular arc, and the center C2 of the second circular arc are located on the same straight line.

In the tire 102, the rim protector 140 is configured such that the thickness thereof gradually decreases from the top PT toward the inner edge PU2. In the tire 102, in a portion inward of the top PT of the rim protector 140 in the radial direction, the thickness of the side piece 138 decreases toward the inner side in the radial direction.

In the rim protector 140 of the tire 102, a portion having a thickness larger than necessary is less likely to be formed. In the tire 102, the influence of the rim protector 140 on the weight of the tire 102 is reduced to be small. The influence of the rim protector 140 on the stiffness of the tire 102 is also not specific. The rim protector 140 effectively enhances the lateral stiffness of the tire 102 while suppressing an increase in the weight of the tire 102.

In FIG. 3, reference character PE indicates the point of intersection between the tread surface 122 and the equator plane CL. In the present invention, the point of intersection PE is referred to as an equator. A solid line BBL is a bead base line. The bead base line BBL is a line that defines the rim diameter (see the JATAM standard.) of the rim. The bead base line BBL extends in the axial direction. A double-headed arrow SH represents the height in the radial direction from the bead base line BBL to the equator PE of the tire 102. The height SH is a cross-sectional height of the tire 102.

Figure 4:
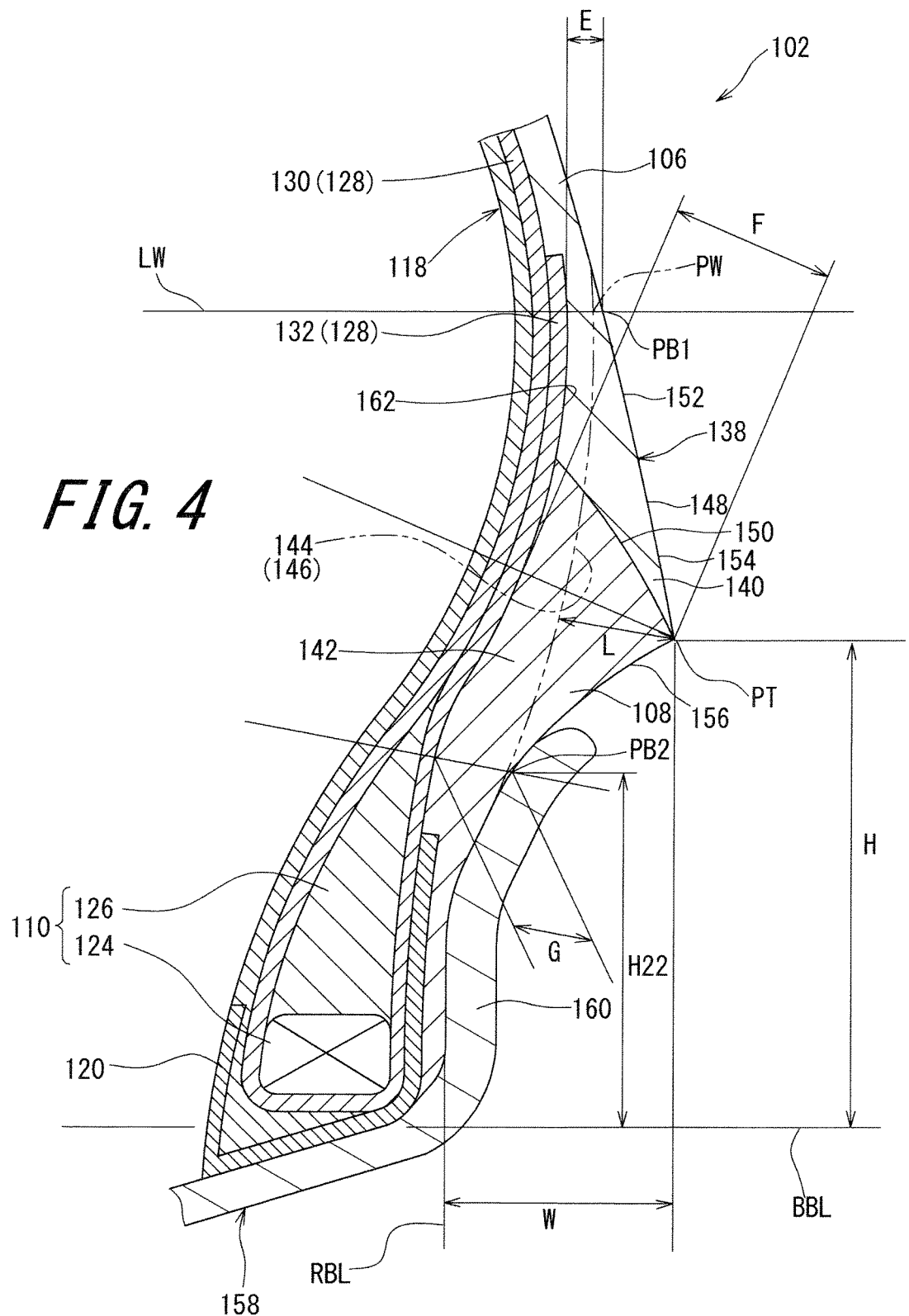
FIG. 4 is an enlarged cross-sectional view of a portion of the tire in FIG. 3.

FIG. 4 shows a rim protector 140 portion of the tire 102 shown in FIG. 3, together with a rim 158. The rim 158 is a normal rim. In FIG. 4, a double-headed arrow H represents the height in the radial direction from the bead base line BBL to the top PT of the rim protector 140.

In the tire 102, the ratio of the height H relative to the cross-sectional height SH is equal to or greater than 0.27. By this ratio being set to be equal to or greater than 0.27, the rim protector 140 is prevented from interfering with a flange 160 of the rim 158. The tire 102 is appropriately mounted onto the rim 158. The volume of the rim protector 140 is appropriately maintained. Thus, in the tire 102, the influence of the rim protector 140 on the weight thereof is suppressed.

In the tire 102, the ratio of the height H relative to the cross-sectional height SH is equal to or less than 0.34. By this ratio being set to be equal to or less than 0.34, the rim protector 140 effectively serves to prevent damage of the flange 160 or the sidewall 106. A top PT portion of the rim protector 140 effectively contributes to the stiffness of a bead 110 portion. Thus, in the tire 102, the lateral stiffness thereof can be enhanced. Furthermore, movement of the bead 110 portion is effectively suppressed. Thus, in the tire 102, an increase in the rolling resistance thereof is suppressed.

In FIG. 4, a double-headed arrow F represents the distance from the carcass 112 to the top PT of the rim protector 140. The distance F is measured along a line normal to an outer surface 162 of the carcass 112. In the present invention, the distance F is the thickness of the side piece 138 at the top PT of the rim protector 140.

In FIG. 4, reference character PB1 represents a specific position on the outer surface of the tire 102. In the tire 102, the position PB1 is the point of intersection between the straight line LW in FIG. 3 and the outer surface of the tire 102. A double-headed arrow E represents the distance from the carcass 112 to the point of intersection PB1. The distance E is measured along the straight line LW. As described above, the straight line LW passes through the first reference position PW. In the present invention, the distance E is the thickness of the side piece 138 at the first reference position PW.

In the tire 102, the ratio of the thickness E of the side piece 138 at the first reference position PW relative to the thickness F of the side piece 138 at the top PT of the rim protector 140 is equal to or greater than 0.20 and equal to or less than 0.30. In the tire 102, the rim protector 140 effectively serves to prevent damage of the flange 160 or the sidewall 106. The volume of the rim protector 140 is appropriately maintained. Thus, the influence of the rim protector 140 on the weight is suppressed. The top PT portion of the rim protector 140 effectively contributes to the stiffness of the bead 110 portion. Thus, in the tire 102, the lateral stiffness thereof can be enhanced. Furthermore, movement of the bead 110 portion is effectively suppressed. Thus, in the tire 102, an increase in the rolling resistance thereof is suppressed. From this standpoint, this ratio is preferably equal to or greater than 0.21 and more preferably equal to or greater than 0.23. This ratio is preferably equal to or less than 0.29 and more preferably equal to or less than 0.27.

In the tire 102, the rim protector 140 projects from the main body 142 of the side piece 138 outward in the axial direction, and the side piece 138 is thickest at the top PT portion of the rim protector 140. The rim protector 140 is shaped such that: the ratio of the height H to the top PT of the rim protector 140 relative to the cross-sectional height SH is within the range of equal to or greater than 0.27 and equal to or less than 0.34; and the ratio of the thickness E of the side piece 138 at the first reference position PW corresponding to the position at which the tire 102 has the maximum width, relative to the thickness F of the side piece 138 at the top PT of the rim protector 140, is within the range of equal to or greater than 0.20 and equal to or less than 0.30.

Regarding the tire 102, even when the tire 102 is mounted onto a rim 158 having a largest size among a plurality of applicable rims 158 specified in the standard on which the tire 102 is based, the rim protector 140 effectively prevents damage of the sidewall 106 or the flange 160. In addition, even when the tire 102 is mounted onto a rim 158 having a smallest size among the plurality of applicable rims 158, interference of the rim protector 140 with the flange 160 is effectively prevented, so that the tire 102 can be appropriately mounted onto the rim 158. Even when the tire 102 is mounted onto any applicable rim 158, the rim protector 140 sufficiently serves to prevent damage of the sidewall 106 or the flange 160. Furthermore, as described above, the rim protector 140 of the tire 102 contributes to enhancement of the stiffness of the tire 102 while suppressing an increase in the weight of the tire 102. According to the present invention, the pneumatic tire 102 that has the rim protector 140 capable of sufficiently exerting its function and has enhanced stiffness while an increase in the weight of the tire 102 is suppressed, is obtained.

In FIG. 4, reference character PB2 represents a specific position on the outer surface of the tire 102. A double-headed arrow H22 represents the height in the radial direction from the bead base line BBL to the position PB2. In the present invention, the ratio of the height H22 relative to the cross-sectional height SH of the tire 102 is 22%. That is, reference character PB2 represents a position at which the height H22 in the radial direction from the bead base line BBL is 22% of the cross-sectional height SH. In the present invention, the position PB2 is referred to as a second reference position. A double-headed arrow G represents the distance from the carcass 112 to the second reference position PB2. The distance G is measured along a line normal to the outer surface 162 of the carcass 112. In the present invention, the distance G is the thickness of the side piece 138 at the second reference position PB2.

The tire 102 is mounted at the bead 110 portion thereof onto the rim 158. A portion of the tire 102 is in contact with the rim 158, and the other portion is not in contact with the rim 158. Movement of the portion of the tire 102 which portion is in contact with the rim 158 is restrained by the rim 158. The stiffness in the vicinity of the boundary between the portion that is in contact with the rim 158 and the portion that is not in contact with the rim 158 is important in the tire 102. The aforementioned position PB2 is located in the vicinity of the boundary.

In the tire 102, preferably, the ratio of the thickness G of the side piece 138 at the second reference position PB2 relative to the thickness F of the side piece 138 at the top PT of the rim protector 140 is equal to or greater than 0.40 and equal to or less than 0.60. In the tire 102, the rim protector 140 more effectively serves to prevent damage of the flange 160 or the sidewall 106. The volume of the rim protector 140 is appropriately maintained. Thus, the influence of the rim protector 140 on the weight is further suppressed. The top PT portion of the rim protector 140 more effectively contributes to the stiffness of the bead 110 portion. Thus, in the tire 102, the lateral stiffness thereof can be further enhanced. Furthermore, movement of the bead 110 portion is more effectively suppressed. Thus, in the tire 102, an increase in the rolling resistance thereof is effectively suppressed. From this standpoint, this ratio is preferably equal to or greater than 0.41 and more preferably equal to or greater than 0.46. This ratio is preferably equal to or less than 0.55 and more preferably equal to or less than 0.54.

In the tire 102, the first circular arc, which represents the profile of the first inclined surface 154, is a circular arc projecting outward. In other words, the first inclined surface 154 has a shape projecting outward. In the tire 102, in the portion outward of the top PT of the rim protector 140 in the radial direction, the amount of change in the thickness of the side piece 138 decreases as the distance to the top PT decreases.

In the tire 102, the second circular arc, which represents the profile of the second inclined surface 156, is a circular arc projecting inward. In other words, the second inclined surface 156 has a shape projecting inward. In the tire 102, in the portion inward of the top PT of the rim protector 140 in the radial direction, the amount of change in the thickness of the side piece 138 increases as the distance to the top PT decreases.

In the tire 102, while formation of a portion having a thickness larger than necessary is suppressed, the rim protector 140 effectively contributes to ensuring a desired thickness over a wide range from the position PS1 to the position PU2, that is, from the maximum width position PW of the tire 102 to a position at which the tire 102 is brought into contact with the rim 158. The rim protector 140 further contributes to enhancement of the stiffness while effectively suppressing an increase in the weight. Furthermore, the rim protector 140 more effectively suppresses movement of the bead 110 portion. Thus, in the tire 102, an increase in the rolling resistance thereof is further suppressed. From this standpoint, in the present invention, as in the tire 102 shown in FIG. 3, preferably, the first inclined surface 154 has a shape projecting outward, and the second inclined surface 156 has a shape projecting inward.

In the tire 102, the ratio of the thickness F of the side piece 138 at the top PT of the rim protector 140 relative to the cross-sectional height SH is preferably equal to or greater than 0.10 and is preferably equal to or less than 0.15. By this ratio being set to be equal to or greater than 0.10, the rim protector 140 effectively serves to prevent damage of the flange 160 or the sidewall 106. The top PT portion of the rim protector 140 effectively contributes to the stiffness of the bead 110 portion. Thus, in the tire 102, the lateral stiffness thereof can be enhanced. Furthermore, movement of the bead 110 portion is effectively suppressed. Thus, in the tire 102, an increase in the rolling resistance thereof is suppressed. By this ratio being set to be equal to or less than 0.15, the volume of the rim protector 140 is appropriately maintained. In the tire 102, the influence of the rim protector 140 on the weight thereof is suppressed. Furthermore, the influence of the rim protector 140 on the stiffness is suppressed. Thus, with the tire 102, favorable ride comfort is maintained.

In the tire 102, the thickness F of the side piece 138 at the top PT of the rim protector 140 is preferably equal to or greater than 9.5 mm and is preferably equal to or less than 14.5 mm. By the thickness F being set to be equal to or greater than 9.5 mm, the rim protector 140 effectively serves to prevent damage of the flange 160 or the sidewall 106. The top PT portion of the rim protector 140 effectively contributes to the stiffness of the bead 110 portion. Thus, in the tire 102, the lateral stiffness thereof can be enhanced. Furthermore, movement of the bead 110 portion is effectively suppressed. Thus, in the tire 102, an increase in the rolling resistance thereof is suppressed. By the thickness F being set to be equal to or less than 14.5 mm, the volume of the rim protector 140 is appropriately maintained. In the tire 102, the influence of the rim protector 140 on the weight thereof is suppressed. Furthermore, the influence of the rim protector 140 on the stiffness is suppressed. Thus, with the tire 102, favorable ride comfort is maintained.

As described above, the first inclined surface 154 of the rim protector 140 is represented by the first circular arc, and the second inclined surface 156 of the rim protector 140 is represented by the second circular arc. In the tire 102, the ratio of the radius of curvature R2 of the second circular arc relative to the radius of curvature R1 of the first circular arc is preferably equal to or greater than 0.066. By this ratio being set to be equal to or greater than 0.066, the rim protector 140 in which the thickness from the reference surface 146 to the first inclined surface 154 is appropriately maintained is obtained. The rim protector 140 serves to prevent damage of the sidewall 106 or the flange 160 and also contributes to enhancement of the stiffness. Entrainment of air caused by the second inclined surface 156 is suppressed, so that occurrence of a molding failure is prevented.

In the tire 102, the ratio of the radius of curvature R2 of the second circular arc relative to the radius of curvature R1 of the first circular arc is preferably equal to or less than 0.117. By this ratio being set to be equal to or less than 0.117, the rim protector 140 maintained with an appropriate thickness is obtained. In the tire 102, the influence of the rim protector 140 on the weight thereof is effectively suppressed.

In the tire 102, the radius of curvature R1 of the first circular arc is preferably equal to or greater than 150 mm and is preferably equal to or less than 450 mm. By the radius of curvature R1 being set to be equal to or greater than 150 mm, the rim protector 140 in which the thickness from the reference surface 146 to the first inclined surface 154 is appropriately maintained is obtained. In the tire 102, the influence of the rim protector 140 on the weight thereof is effectively suppressed. The rim protector 140 having the first inclined surface 154 that is substantially flat is obtained. Thus, even when a plurality of tires 102 are piled up and stored, collapse of the tires 102 is less likely to occur. By the radius of curvature R1 being set to be equal to or less than 450 mm, the rim protector 140 in which the thickness from the reference surface 146 to the first inclined surface 154 is appropriately maintained is obtained. The rim protector 140 serves to prevent damage of the sidewall 106 or the flange 160 and also contributes to enhancement of the stiffness.

In the tire 102, the radius of curvature R2 of the second circular arc is preferably equal to or greater than 15 mm and is preferably equal to or less than 40 mm. By the radius of curvature R2 being set to be equal to or greater than 15 mm, entrainment of air caused by the second inclined surface 156 is suppressed. In the tire 102, occurrence of a molding failure is prevented. By the radius of curvature R2 being set to be equal to or less than 40 mm, the rim protector 140 in which the thickness from the reference surface 146 to the second inclined surface 156 is appropriately maintained is obtained. In the tire 102, the influence of the rim protector 140 on the weight thereof is effectively suppressed.

In the tire 102, the radius of curvature R1 of the first circular arc is larger than the radius of curvature Rs of the outer circular arc. Thus, the rim protector 140 in which the thickness from the reference surface 146 to the first inclined surface 154 is appropriately maintained is obtained. The rim protector 140 serves to prevent damage of the sidewall 106 or the flange 160 and also contributes to enhancement of the stiffness. From this standpoint, the ratio of the radius of curvature R1 relative to the radius of curvature Rs is preferably equal to or greater than 2 and more preferably equal to or greater than 3. From the standpoint that the rim protector 140 in which the thickness from the reference surface 146 to the first inclined surface 154 is appropriately maintained is obtained, and the influence of the rim protector 140 on the weight is suppressed, the ratio of the radius of curvature R1 relative to the radius of curvature Rs is preferably equal to or less than 10 and more preferably equal to or less than 9.

In FIG. 4, a solid line RBL is a rim base line. The rim base line RBL is a line that defines the rim width (see the JATAM standard.) of the rim 158. The rim base line RBL extends in the radial direction. A double-headed arrow W represents the distance in the axial direction from the rim base line RBL to the top PT of the rim protector 140. The distance W is the projecting length of the rim protector 140.

In the tire 102, preferably, the projecting length W is equal to or greater than 12 mm. By the projecting length W being set to be equal to or greater than 12 mm, the rim protector 140 effectively serves to prevent damage of the flange 160 or the sidewall 106. The top PT portion of the rim protector 140 effectively contributes to the stiffness of the bead 110 portion. Thus, in the tire 102, the lateral stiffness thereof can be enhanced. Furthermore, movement of the bead 110 portion is effectively suppressed. Thus, in the tire 102, an increase in the rolling resistance thereof is suppressed.

In the tire 102, preferably, the projecting length W is equal to or less than 18 mm. By the projecting length W being set to be equal to or less than 18 mm, the volume of the rim protector 140 is appropriately maintained. In the tire 102, the influence of the rim protector 140 on the weight thereof is suppressed. Furthermore, the influence of the rim protector 140 on the stiffness is suppressed. Thus, with the tire 102, favorable ride comfort is maintained.

In FIG. 4, a double-headed arrow L represents the distance from the outer surface 144 of the main body 142, that is, the reference surface 146, to the top PT of the rim protector 140. The distance L is measured along a line normal to the reference surface 146. In the present invention, the distance L is the thickness of the rim protector 140 at the top PT of the rim protector 140.

In the tire 102, the ratio of the thickness L of the rim protector 140 at the top PT of the rim protector 140 relative to the projecting length W is preferably equal to or greater than 0.33 and equal to or less than 0.60. By this ratio being set to be equal to or greater than 0.33, the rim protector 140 effectively serves to prevent damage of the flange 160 or the sidewall 106. The top PT portion of the rim protector 140 effectively contributes to the stiffness of the bead 110 portion. Thus, in the tire 102, the lateral stiffness thereof can be enhanced. Furthermore, movement of the bead 110 portion is effectively suppressed. Thus, in the tire 102, an increase in the rolling resistance thereof is suppressed. By this ratio being set to be equal to or less than 0.60, the volume of the rim protector 140 is appropriately maintained. In the tire 102, the influence of the rim protector 140 on the weight thereof is suppressed. Furthermore, the influence of the rim protector 140 on the stiffness is suppressed. Thus, with the tire 102, favorable ride comfort is maintained.

Third Embodiment

Figure 5:
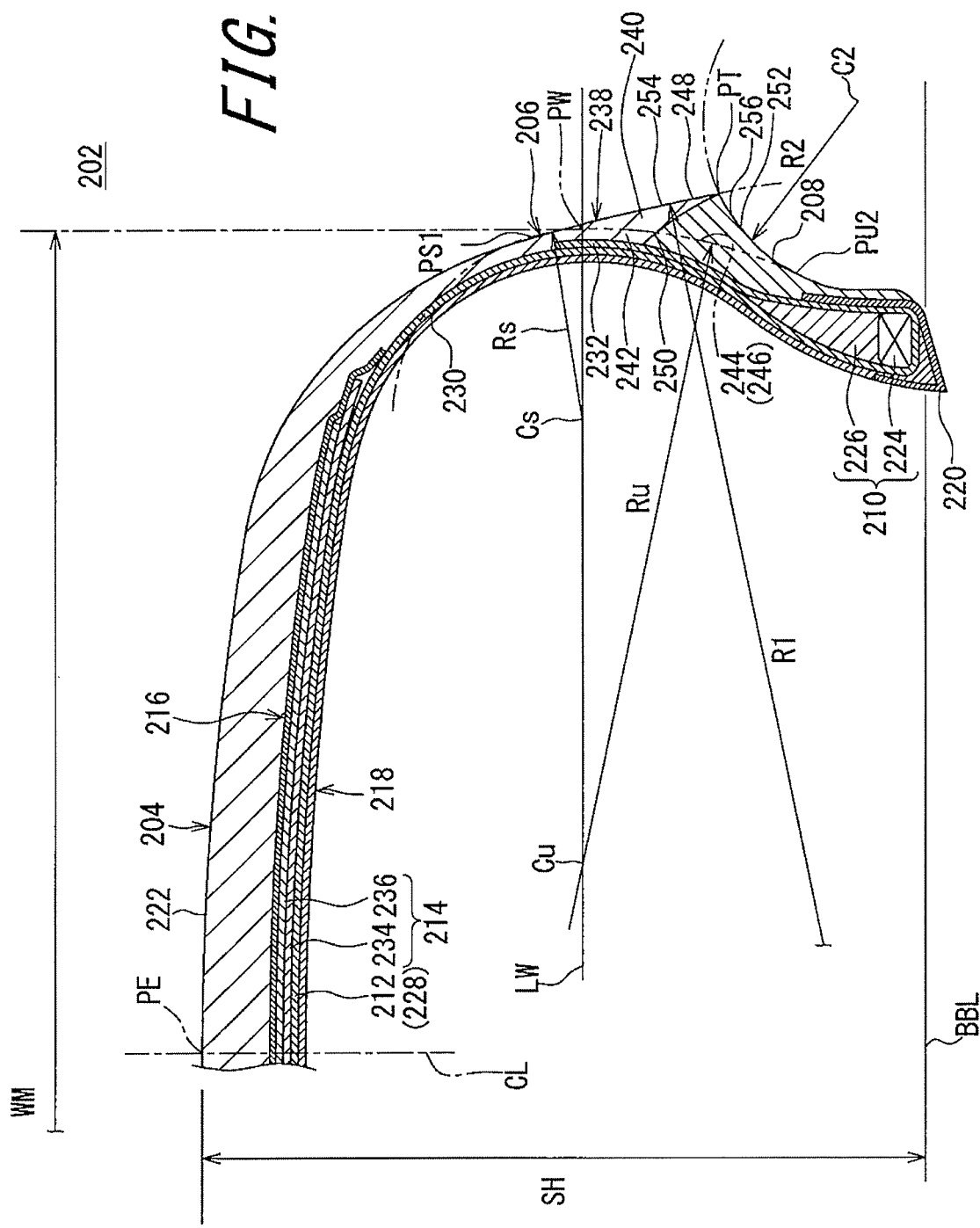
FIG. 5 is a cross-sectional view of a portion of a pneumatic tire according to still another embodiment of the present invention.

FIG. 5 shows a cross-section of a pneumatic tire 202 according to a third embodiment. In FIG. 5, the up-down direction is the radial direction of the tire 202, the right-left direction is the axial direction of the tire 202, and the direction perpendicular to the surface of the sheet is the circumferential direction of the tire 202. The cross-section shown in FIG. 5 is obtained by cutting the tire 202 along a plane perpendicular to the circumferential direction.

In FIG. 5, an alternate long and short dash line CL represents the equator plane of the tire 202. The shape of the tire 202 is symmetrical about the equator plane CL except for a tread pattern.

The tire 202 includes a tread 204, a pair of sidewalls 206, a pair of clinches 208, a pair of beads 210, a carcass 212, a belt 214, a band 216, an inner liner 218, and a pair of chafers 220. The tire 202 is of a tubeless type. The tire 202 is mounted to a passenger car.

The tread 204 has a shape projecting outward in the radial direction. The tread 204 forms a tread surface 222 that is brought into contact with a road surface. The tread 204 is formed from a crosslinked rubber that is excellent in wear resistance, heat resistance, and grip performance. Although not shown, grooves can be formed on the tread 204. Accordingly, the tread pattern is formed.

Each sidewall 206 extends from the tread 204 substantially inward in the radial direction. Although not shown, a radially outer portion of the sidewall 206 is joined to the tread 204. A radially inner portion of the sidewall 206 is joined to the clinch 208. The sidewall 206 is formed from a crosslinked rubber that is excellent in cut resistance and weather resistance. The sidewall 206 prevents the carcass 212 from being damaged.

Each clinch 208 is located inward of the sidewall 206 in the radial direction. The clinch 208 is located outward of the bead 210 and the carcass 212 in the axial direction. The clinch 208 is formed from a crosslinked rubber that is excellent in wear resistance. The clinch 208 comes into contact with a flange of a rim.

Each bead 210 is located inward of the clinch 208 in the axial direction. The bead 210 includes a core 224 and an apex 226 extending from the core 224 outward in the radial direction. The core 224 has a ring shape and includes a non-stretchable wound wire. A typical material of the wire is steel. The apex 226 is tapered outward in the radial direction. The apex 226 is formed from a highly hard crosslinked rubber.

The carcass 212 includes a carcass ply 228. The carcass ply 228 extends along the tread 204, each sidewall 206, and each clinch 208. The carcass ply 228 extends on and between the beads 210 at both sides. The carcass ply 228 is turned up around each core 224 from the inner side toward the outer side in the axial direction. Because of this turning-up, a main portion 230 and turned-up portions 232 are formed in the carcass ply 228. In the tire 202, the carcass 212 is formed of the one carcass ply 228. The carcass 212 may be formed of two or more carcass plies 228.

The carcass ply 228 includes a large number of cords aligned with each other, and a topping rubber, which are not shown. The absolute value of the angle of each cord relative to the equator plane CL is 75° to 90°. In other words, the carcass 212 has a radial structure. The cords are formed from an organic fiber. Examples of preferable organic fibers include polyester fibers, nylon fibers, rayon fibers, polyethylene naphthalate fibers, and aramid fibers.

The belt 214 is located inward of the tread 204 in the radial direction. The belt 214 is laminated on the carcass 212. The belt 214 reinforces the carcass 212. The belt 214 includes an inner layer 234 and an outer layer 236. As is obvious from FIG. 5, the width of the inner layer 234 is slightly larger than the width of the outer layer 236 in the axial direction.

Each of the inner layer 234 and the outer layer 236 includes a large number of cords aligned with each other, and a topping rubber, which are not shown. Each cord is tilted relative to the equator plane CL. The absolute value of the tilt angle is generally equal to or greater than 10° and equal to or less than 35°. The direction in which each cord of the inner layer 234 is tilted relative to the equator plane CL is opposite to the direction in which each cord of the outer layer 236 is tilted relative to the equator plane CL. The material of the cords is preferably steel. An organic fiber may be used for the cords. The width, in the axial direction, of the belt 214 is preferably equal to or greater than 0.7 times of the maximum width of the tire 202. The belt 214 may include three or more layers.

The band 216 is located outward of the belt 214 in the radial direction. The width of the band 216 is larger than the width of the belt 214 in the axial direction. The band 216 covers the entirety of the belt 214.

The band 216 includes a cord and a topping rubber, which are not shown. The cord is helically wound. The band 216 has a so-called jointless structure. The cord extends substantially in the circumferential direction. The angle of the cord relative to the circumferential direction is equal to or less than 5° and further equal to or less than 2°. The belt 214 is held by the cord, so that lifting of the belt 214 is suppressed. The cord is formed from an organic fiber. Examples of preferable organic fibers include nylon fibers, polyester fibers, rayon fibers, polyethylene naphthalate fibers, and aramid fibers.

The belt 214 and the band 216 form a reinforcing layer. The reinforcing layer may be composed of only the belt 214. The reinforcing layer may be composed of only the band 216.

The inner liner 218 is located inward of the carcass 212. The inner liner 218 is joined to the inner surface of the carcass 212. The inner liner 218 is formed from a cross-linked rubber that is excellent in air blocking property. A typical base rubber of the inner liner 218 is an isobutylene-isoprene-rubber or a halogenated isobutylene-isoprene-rubber. The inner liner 218 maintains the internal pressure of the tire 202.

Each chafer 220 is located in the vicinity of the bead 210. When the tire 202 is mounted onto the rim, the chafer 220 comes into contact with the rim. Because of this contact, the vicinity of the bead 210 is protected. In this embodiment, the chafer 220 includes a fabric and a rubber with which the fabric is impregnated. The chafer 220 may be integrated with the clinch 208. In this case, the material of the chafer 220 is the same as the material of the clinch 208.

In the present invention, a portion of the tire 202 at the axially outer side of the carcass 212 and from each sidewall 206 to each clinch 208 is referred to as a side piece 238. The side piece 238 includes the sidewall 206 and the clinch 208. In the tire 202, the side piece 238 is composed of the sidewall 206 and the clinch 208.

As described above, each sidewall 206 extends from the tread 204 substantially inward in the radial direction. Each clinch 208 is located inward of the sidewall 206 in the radial direction. Each side piece 238 of the tire 202 extends from the tread 204 substantially inward in the radial direction.

As is obvious from FIG. 5, the clinch 208 forms a radially inner portion of the side piece 238. As described above, each bead 210 is located inward of the clinch 208 in the axial direction. At the radially inner portion of the side piece 238, the bead 210 of the tire 202 is located inward of the side piece 238 in the axial direction.

The aspect ratio (see the JATAM standard.) of the tire 202 is equal to or less than 50%. Specifically, the aspect ratio of the tire 202 is 45%. The tire 202 is of a low-flattening type. A rim protector 240 is provided in each side piece 238 of the tire 202. In other words, in the tire 202, each side piece 238 includes the rim protector 240. The rim protector 240 extends in the circumferential direction. Specifically, each side piece 238 includes a main body 242 and the rim protector 240 extending in the circumferential direction. The rim protector 240 is located outward of the main body 242 in the axial direction. The rim protector 240 projects from an outer surface 244 of the main body 242 outward in the axial direction. In the present invention, the outer surface 244 of the main body 242 is also referred to as a reference surface 246 of the side piece 238.

In FIG. 5, reference character PT indicates a top of the rim protector 240. The top PT is represented by a position at which a height from the reference surface 246 is maximum. The height from the reference surface 246 is obtained by measuring the length from the reference surface 246 to an outer surface 248 of the rim protector 240 along a line normal to the reference surface 246 in the cross-section shown in FIG. 5.

As described above, the side piece 238 of the tire 202 is composed of the sidewall 206 and the clinch 208. A boundary 250 between the sidewall 206 and the clinch 208 is the radially inner surface of the sidewall 206 and is the radially outer surface of the clinch 208. The side piece 238 is laminated on the carcass 212. Thus, the boundary 250 intersects the carcass 212. The boundary 250 extends substantially outward in the axial direction from the point of intersection with the carcass 212. As shown in FIG. 5, the boundary 250 intersects the outer surface 248 of the rim protector 240 at the top PT. The boundary 250 may intersect the outer surface 248 of the rim protector 240 at a portion outward of the top PT in the radial direction. The boundary 250 may intersect the outer surface 248 of the rim protector 240 at a portion inward of the top PT in the radial direction.

In the present invention, each of the contours of the tire 202 and the components forming the tire 202 is referred to as a profile. The profile is specified on the basis of dimensions measured in a state where the tire 202 is mounted on a normal rim and inflated with air to a normal internal pressure, unless otherwise specified. During the measurement of the dimensions for profile specification, no load is applied to the tire 202. In the case where grooves are formed on the tread 204, a profile of the tread surface 222 is specified by a virtual outer surface obtained by assuming that the grooves are not present. In the case where a recessed and projecting pattern is provided on the side piece 238, the profile of an outer surface 252 of the side piece 238 is specified by a virtual outer surface obtained assuming that the recessed and projecting pattern is not present. The profile of the outer surface 244 of the main body 242 described above is specified by a virtual outer surface obtained by assuming that the rim protector 240 is not present in the side piece 238. Similarly to the dimensions for profile specification, the dimensions and angles of each component of the tire 202 are also measured in a state where the tire 202 is mounted on a normal rim and inflated with air to a normal internal pressure, unless otherwise specified. During the measurement, no load is applied to the tire 202. In the case where the tire 202 is designed for a passenger car, the dimensions and angles are measured in a state where the internal pressure is 180 kPa, unless otherwise specified.

In the present specification, the normal rim means a rim specified in a standard on which the tire 202 is based. The "standard rim" in the JATMA standard, the "Design Rim" in the TRA standard, and the "Measuring Rim" in the ETRTO standard are normal rims.

In the present specification, the normal internal pressure means an internal pressure specified in the standard on which the tire 202 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

In the present specification, a normal load means a load specified in the standard on which the tire 202 is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRO standard are normal loads.

In FIG. 5, reference character PW represents a specific position on the outer surface 244 of the main body 242, that is, on the reference surface 246. In the tire 202, the distance in the axial direction between the right and left reference surfaces 246 is maximum at the position PW. In the present invention, the distance WM in the axial direction between the right and left reference surfaces 246 at the position PW is represented as the maximum width (also referred to as cross-sectional width) of the tire 202. In other words, position PW corresponds to a position at which the tire 202 has the maximum width WM, in the axial direction. In the present invention, the position PW is also referred to as a reference position. In FIG. 5, a solid line LW is a straight line that passes through the reference position PW and extends in the axial direction.

In the tire 202, the profile of the reference surface 246 is represented by a plurality of circular arcs aligned in the radial direction. In other words, the profile of the reference surface 246 includes a plurality of circular arcs aligned in the radial direction. In the present invention, these circular arcs includes a circular arc (hereinafter, referred to as an outer circular arc) extending from the reference position PW substantially outward in the radial direction and a circular arc (hereinafter, referred to as an inner circular arc) extending from the reference position PW substantially inward in the radial direction.

In FIG. 5, an arrow Rs represents the radius of curvature of the outer circular arc. An arrow Ru represents the radius of curvature of the inner circular arc. Reference character Cs indicates the center of the outer circular arc, and reference character Cu indicates the center of the inner circular arc. As shown in FIG. 5, the center Cs of the outer circular arc and the center Cu of the inner circular arc are located on the straight line LW. In the tire 202, the outer circular arc and the inner circular arc are tangent to each other at the reference position PW. The reference position PW is the tangent point between the outer circular arc and the inner circular arc.

In the tire 202, the outer circular arc has a shape projecting outward. The inner circular arc has a shape projecting outward. The profile of the reference surface 246, that is, of the outer surface 244 of the main body 242 include an outer circular arc and an inner circular arc, and the outer circular arc and the inner circular arc are tangent to each other at the reference position PW. As described above, the reference position PW corresponds to the position at which the tire 202 has the maximum width WM. The reference surface 246 has a shape projecting outward in the axial direction. The side piece 238 having the reference surface 246 contributes to bending.

In the tire 202, in light of appropriate bending and support of a vehicle weight, the radius of curvature Rs of the outer circular arc is preferably equal to or greater than 30 mm and equal to or less than 40 mm. The radius of curvature Ru of the inner circular arc is preferably equal to or greater than 45 mm and equal to or less than 55 mm. In the tire 202, the radius of curvature Ru of the inner circular arc is preferably larger than the radius of curvature Rs of the outer circular arc. Specifically, the ratio of the radius of curvature Ru of the inner circular arc relative to the radius of curvature Rs of the outer circular arc is preferably equal to or greater than 1.38 and equal to or less than 1.48.

In the tire 202, the rim protector 240 has a first inclined surface 254 and a second inclined surface 256. The first inclined surface 254 is a portion of the outer surface 248 of the rim protector 240. The first inclined surface 254 extends from the top PT of the rim protector 240 substantially outward in the radial direction. The second inclined surface 256 is also a portion of the outer surface 248 of the rim protector 240. The second inclined surface 256 extends from the top PT of the rim protector 240 substantially inward in the radial direction. In the cross-section shown in FIG. 5, the rim protector 240 has a shape spreading from the top PT toward the reference surface 246.

In the tire 202, the profile of the first inclined surface 254 is represented by a circular arc. In the present invention, the circular arc that represents the profile of the first inclined surface 254 is referred to as a first circular arc. In the tire 202, the profile of the second inclined surface 256 is also represented by a circular arc. In the present invention, the circular arc that represents the profile of the second inclined surface 256 is referred to as a second circular arc. In FIG. 5, an arrow R1 represents the radius of curvature of the first circular arc, and an arrow R2 represents the radius of curvature of the second circular arc. In FIG. 5, the center of the first circular arc is not shown, but reference character C2 indicates the center of the second circular arc.

In FIG. 5, a position PS1 is the radially outer edge of the rim protector 240. The position PS1 is also the radially outer edge of the first inclined surface 254. In the tire 202, at the position PS1, that is, at the outer edge PS1, the first circular arc is tangent to the outer circular arc. The position PS1 is the tangent point between the first circular arc and the outer circular arc. In the tire 202, the position PS1, the center Cs of the outer circular arc, and the center (not shown) of the first circular arc are located on the same straight line.

In the tire 202, the rim protector 240 is configured such that the thickness thereof gradually increases from the outer edge PS1 toward the top PT. In the tire 202, in a portion outward of the top PT of the rim protector 240 in the radial direction, the thickness of the side piece 238 increases toward the inner side in the radial direction.

In FIG. 5, a position PU2 is the radially inner edge of the rim protector 240. The position PU2 is also the radially inner edge of the second inclined surface 256. In the tire 202, at the position PU2, that is, at the inner edge PU2, the second circular arc is tangent to the inner circular arc. The position PU2 is the tangent point between the second circular arc and the inner circular arc. In the tire 202, the position PU2, the center Cu of the inner circular arc, and the center C2 of the second circular arc are located on the same straight line.

In the tire 202, the rim protector 240 is configured such that the thickness thereof gradually decreases from the top PT toward the inner edge PU2. In the tire 202, in a portion inward of the top PT of the rim protector 240 in the radial direction, the thickness of the side piece 238 decreases toward the inner side in the radial direction.

In the rim protector 240 of the tire 202, a portion having a thickness larger than necessary is less likely to be formed. In the tire 202, the influence of the rim protector 240 on the weight of the tire 202 is reduced to be small. The influence of the rim protector 240 on the stiffness of the tire 202 is also not specific. The rim protector 240 effectively enhances the lateral stiffness of the tire 202 while suppressing an increase in the weight of the tire 202.

Figure 6:
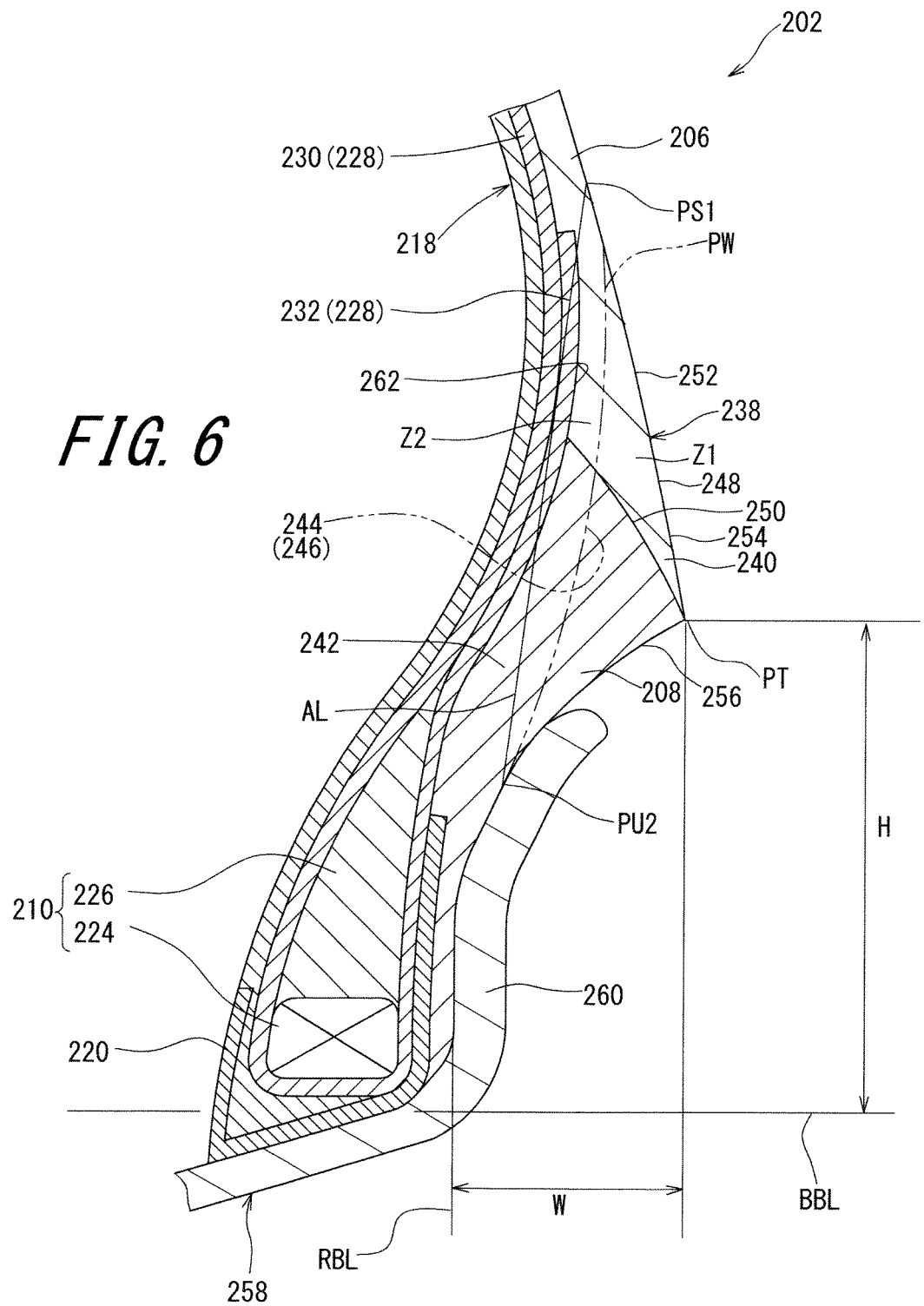
FIG. 6 is an enlarged cross-sectional view of a portion of the tire in FIG. 5.

FIG. 6 shows a rim protector 240 portion of the tire 202 shown in FIG. 5, together with a rim 258. The rim 258 is a normal rim. In FIG. 6, the up-down direction is the radial direction of the tire 202, the right-left direction is the axial direction of the tire 202, and the direction perpendicular to the surface of the sheet is the circumferential direction of the tire 202. A cross-section shown in FIG. 6 is along a plane perpendicular to the circumferential direction of the tire 202. In FIG. 6, a double-headed arrow H represents the height in the radial direction from a bead base line BBL to the top PT of the rim protector 240.

In FIG. 6, a solid line AL is a line segment connecting the radially outer edge PS1 of the first inclined surface 254 to the radially inner edge PU2 of the second inclined surface 256. In the present invention, the line segment AL is referred to as a reference line segment. In FIG. 6, a region surrounded by the outer surface 244 of the main body 242, the first inclined surface 254, and the second inclined surface 256 is represented by reference character Z1. In FIG. 6, a region surrounded by the reference line segment AL and the outer surface 244 of the main body 242 is represented by reference character Z2. When the area of the region Z1 is denoted by S1 and the area of the region Z2 is denoted by S2, the area of a region surrounded by the reference line segment AL, the first inclined surface 254, and the second inclined surface 256 is represented by the sum (S1+S2) of the area S1 and the area S2.

In the tire 202, the ratio of the area S2 of the region surrounded by the reference line segment AL and the outer surface 244 of the main body 242 relative to the area (S1+S2) of the region surrounded by the reference line segment AL, the first inclined surface 254, and the second inclined surface 256 is equal to or greater than 0.40 and equal to or less than 0.48. In the tire 202, the rim protector 240 effectively serves to prevent damage of a flange 260 or the sidewall 206. The volume of the rim protector 240 is appropriately maintained. Thus, the influence of the rim protector 240 on the weight is suppressed. A top PT portion of the rim protector 240 effectively contributes to the stiffness of a bead 210 portion. Thus, in the tire 202, the lateral stiffness thereof can be enhanced. Furthermore, movement of the bead 210 portion is effectively suppressed. Thus, in the tire 202, an increase in the rolling resistance thereof is effectively suppressed. From this standpoint, this ratio is preferably equal to or greater than 0.42 and is preferably equal to or less than 0.46.

In the tire 202, the rim protector 240 projects from the outer surface 244 of the main body 242 of the side piece 238 outward in the axial direction, and the side piece 238 is thickest at the top PT portion of the rim protector 240. The rim protector 240 is shaped such that, when a line segment connecting the radially outer edge PS1 of the first inclined surface 254 to the radially inner edge PU2 of the second inclined surface 256 is defined as the reference line segment AL, the ratio of the area S2 of the region surrounded by the reference line segment AL and the outer surface 244 of the main body 242 relative to the area (S1+S2) of the region surrounded by the reference line segment AL, the first inclined surface 254, and the second inclined surface 256 is within the range of equal to or greater than 0.40 and equal to or less than 0.48.

Regarding the tire 202, even when the tire 202 is mounted onto a rim 258 having a largest size among a plurality of applicable rims 258 specified in the standard on which the tire 202 is based, the rim protector 240 effectively prevents damage of the sidewall 206 or the flange 260. In addition, even when the tire 202 is mounted onto a rim 258 having a smallest size among the plurality of applicable rims 258, interference of the rim protector 240 with the flange 260 is effectively prevented, so that the tire 202 can be appropriately mounted onto the rim 258. Even when the tire 202 is mounted onto any applicable rim 258, the rim protector 240 sufficiently serves to prevent damage of the sidewall 206 or the flange 260. Furthermore, as described above, the rim protector 240 of the tire 202 contributes to enhancement of the stiffness of the tire 202 while suppressing an increase in the weight of the tire 202. According to the present invention, the pneumatic tire 202 that has the rim protector 240 capable of sufficiently exerting its function and has enhanced stiffness while an increase in the weight of the tire 202 is suppressed, is obtained.

In FIG. 5, reference character PE indicates the point of intersection between the tread surface 222 and the equator plane CL. In the present invention, the point of intersection PE is referred to as an equator. A solid line BBL is a bead base line. The bead base line BBL is a line that defines the rim diameter (see the JATAM standard.) of the rim 258. The bead base line BBL extends in the axial direction. A double-headed arrow SH represents the height in the radial direction from the bead base line BBL to the equator PE of the tire 202. The height SH is a cross-sectional height of the tire 202.

In the tire 202, the ratio of a height H (see FIG. 6) in the radial direction from the bead base line BBL to the top PT of the rim protector 240 relative to the cross-sectional height SH is preferably equal to or greater than 0.27. By this ratio being set to be equal to or greater than 0.27, interference of the rim protector 240 with the flange 260 of the rim 258 is effectively prevented. The tire 202 is appropriately mounted onto the rim 258. The volume of the rim protector 240 is appropriately maintained. Thus, in the tire 202, the influence of the rim protector 240 on the weight thereof is suppressed.

In the tire 202, the ratio of the height H relative to the cross-sectional height SH is preferably equal to or less than 0.34. By this ratio being set to equal to or less than 0.34, the rim protector 240 effectively serves to prevent damage of the flange 260 or the sidewall 206. The top PT portion of the rim protector 240 effectively contributes to the stiffness of the bead 210 portion. Thus, in the tire 202, the lateral stiffness thereof can be enhanced. Furthermore, movement of the bead 210 portion is effectively suppressed. Thus, in the tire 202, an increase in the rolling resistance thereof is suppressed.

In the tire 202, the first circular arc, which represents the profile of the first inclined surface 254, is a circular arc projecting outward. In other words, the first inclined surface 254 has a shape projecting outward. In the tire 202, in the portion outward of the top PT of the rim protector 240 in the radial direction, the amount of change in the thickness of the side piece 238 decreases as the distance to the top PT decreases.

In the tire 202, the second circular arc, which represents the profile of the second inclined surface 256, is a circular arc projecting inward. In other words, the second inclined surface 256 has a shape projecting inward. In the tire 202, in the portion inward of the top PT of the rim protector 240 in the radial direction, the amount of change in the thickness of the side piece 238 increases as the distance to the top PT decreases.

In the tire 202, while formation of a portion having a thickness larger than necessary is suppressed, the rim protector 240 effectively contributes to ensuring a desired thickness over a wide range from the position PS1 to the position PU2, that is, from the maximum width position PW of the tire 202 to a position at which the tire 202 is brought into contact with the rim 258. The rim protector 240 further contributes to enhancement of the stiffness while effectively suppressing an increase in the weight. Furthermore, the rim protector 240 more effectively suppresses movement of the bead 210 portion. Thus, in the tire 202, an increase in the rolling resistance thereof is further suppressed. From this standpoint, in the present invention, as in the tire 202 shown in FIG. 5, preferably, the first inclined surface 254 has a shape projecting outward, and the second inclined surface 256 has a shape projecting inward.

As described above, the first inclined surface 254 of the rim protector 240 is represented by the first circular arc, and the second inclined surface 256 of the rim protector 240 is represented by the second circular arc. In the tire 202, the ratio of the radius of curvature R2 of the second circular arc relative to the radius of curvature R1 of the first circular arc is preferably equal to or greater than 0.066. By this ratio being set to be equal to or greater than 0.066, the rim protector 240 in which the thickness from the reference surface 246 to the first inclined surface 254 is appropriately maintained is obtained. The rim protector 240 serves to prevent damage of the sidewall 206 or the flange 260 and also contributes to enhancement of the stiffness. Entrainment of air caused by the second inclined surface 256 is suppressed, so that occurrence of a molding failure is prevented.

In the tire 202, the ratio of the radius of curvature R2 of the second circular arc relative to the radius of curvature R1 of the first circular arc is preferably equal to or less than 0.117. By this ratio being set to be equal to or less than 0.117, the rim protector 240 maintained with an appropriate thickness is obtained. In the tire 202, the influence of the rim protector 240 on the weight thereof is effectively suppressed.

In the tire 202, the radius of curvature R1 of the first circular arc is preferably equal to or greater than 150 mm and is preferably equal to or less than 450 mm. By the radius of curvature R1 being set to be equal to or greater than 150 mm, the rim protector 240 in which the thickness from the reference surface 246 to the first inclined surface 254 is appropriately maintained is obtained. In the tire 202, the influence of the rim protector 240 on the weight thereof is effectively suppressed. The rim protector 240 having the first inclined surface 254 that is substantially flat is obtained. Thus, even when a plurality of tires 202 are piled up and stored, collapse of the tires 202 is less likely to occur. By the radius of curvature R1 being set to be equal to or less than 450 mm, the rim protector 240 in which the thickness from the reference surface 246 to the first inclined surface 254 is appropriately maintained is obtained. The rim protector 240 serves to prevent damage of the sidewall 206 or the flange 260 and also contributes to enhancement of the stiffness.

In the tire 202, the radius of curvature R2 of the second circular arc is preferably equal to or greater than 15 mm and is preferably equal to or less than 40 mm. By the radius of curvature R2 being set to be equal to or greater than 15 mm, entrainment of air caused by the second Inclined surface 256 is suppressed. In the tire 202, occurrence of a molding failure is prevented. By the radius of curvature R2 being set to be equal to or less than 40 mm, the rim protector 240 in which the thickness from the reference surface 246 to the second inclined surface 256 is appropriately maintained is obtained. In the tire 202, the influence of the rim protector 240 on the weight thereof is effectively suppressed.

In the tire 202, the radius of curvature R1 of the first circular arc is larger than the radius of curvature Rs of the outer circular arc. Thus, the rim protector 240 in which the thickness from the reference surface 246 to the first inclined surface 254 is appropriately maintained is obtained. The rim protector 240 serves to prevent damage of the sidewall 206 or the flange 260 and also contributes to enhancement of the stiffness. From this standpoint, the ratio of the radius of curvature R1 relative to the radius of curvature Rs is preferably equal to or greater than 2 and more preferably equal to or greater than 3. From the standpoint that the rim protector 240 in which the thickness from the reference surface 246 to the first inclined surface 254 is appropriately maintained is obtained, and the influence of the rim protector 240 on the weight is suppressed, the ratio of the radius of curvature R1 relative to the radius of curvature Rs is preferably equal to or less than 10 and more preferably equal to or less than 9.

In FIG. 6, a solid line RBL is a rim base line. The rim base line RBL is a line that defines the rim width (see the JATAM standard.) of the rim 258. The rim base line RBL extends in the radial direction. A double-headed arrow W represents the distance in the axial direction from the rim base line RBL to the top PT of the rim protector 240. The distance W is the projecting length of the rim protector 240.

In the tire 202, preferably, the projecting length W is equal to or greater than 12 mm. By the projecting length W being set to be equal to or greater than 12 mm, the rim protector 240 effectively serves to prevent damage of the flange 260 or the sidewall 206. The top PT portion of the rim protector 240 effectively contributes to the stiffness of the bead 210 portion. Thus, in the tire 202, the lateral stiffness thereof can be enhanced. Furthermore, movement of the bead 210 portion is effectively suppressed. Thus, in the tire 202, an increase in the rolling resistance thereof is suppressed.

In the tire 202, preferably, the projecting length W is equal to or less than 18 mm. By the projecting length W being set to be equal to or less than 18 mm, the volume of the rim protector 240 is appropriately maintained. In the tire 202, the influence of the rim protector 240 on the weight thereof is suppressed. Furthermore, the influence of the rim protector 240 on the stiffness is suppressed. Thus, with the tire 202, favorable ride comfort is maintained.

EXAMPLES

Experiment 1

Example 1

The tire shown in FIGS. 1 and 2 was produced. The size of the tire is 225/45R17. In Example 1, the radius of curvature R1 of the first circular arc, the radius of curvature R2 of the second circular arc, the height H in the radial direction to the top PT of the rim protector, the projecting length W of the rim protector, the length LA from the point of intersection PA between the radially outer surface of the clinch and the carcass to the point of intersection PB between the outer surface and the reference surface, and the length LB from the point of intersection PB to the top PT were set as shown in Table 1 below. Thus, the sum (LA+LB) of the length LA and the length LB, the ratio (R2/R1) of the radius of curvature R2 relative to the radius of curvature R1, the ratio (H/SH) of the height H relative to the cross-sectional height SH, the ratio ((LA+LB)/W) of the sum (LA+LB) relative to the projecting length W, and the ratio (LA/(LA+LB)) of the length LA relative to the sum (LA+LB) were adjusted as in Table 1 below. In Example 1, the radius of curvature Rs of the outer circular arc of the reference surface was 35 mm, and the radius of curvature Ru of the inner circular arc of the reference surface was 50 mm.

Comparative Example 1

A tire of Comparative Example 1 is a conventional tire. In Comparative Example 1, the first circular arc, which represents the profile of the first inclined surface of the rim protector, had a shape projecting inward. The radius of curvature R1, the radius of curvature R2, the height H, the length W, the length LA, the length LB, the sum (LA+LB), the ratio (R2/R1), the ratio (H/SH), the ratio ((LA+LB)/W), and the ratio (LA/(LA+LB)) are as shown in Table 1 below.

Examples 2 to 5

Tires of Examples 2 to 5 were obtained in the same manner as in Example 1, except the radius of curvature R1 was changed such that the ratio (R2/R1) was as shown in Table 1 below.

Examples 6 to 10

Tires of Examples 6 to 10 were obtained in the same manner as in Example 1, except the radius of curvature R2 was changed such that the ratio (R2/R1) was as shown in Table 2 below.

Examples 11 to 14 and Comparative Examples 2 and 3

Tires of Examples 11 to 14 and Comparative Examples 2 and 3 were obtained in the same manner as in Example 1, except the height H was changed such that the ratio (H/SH) was as shown in Table 3 below.

Examples 15 to 18 and Comparative Examples 4 and 5

Tires of Examples 15 to 18 and Comparative Examples 4 and 5 were obtained in the same manner as in Example 1, except the length W was changed such that the ratio ((LA+LB)/W) was as shown in Table 4 below.

Examples 19 to 22

Tires of Examples 19 to 22 were obtained in the same manner as in Example 1, except the length LB was changed such that the sum (LA+LB), the ratio ((LA+LB)/W), and the ratio (LA/(LA+LB)) were as shown in Table 5 below.

Examples 23 to 26

Tires of Examples 23 to 26 were obtained in the same manner as in Example 1, except the length LA was changed such that the sum (LA+LB), the ratio ((LA+LB)/W), and the ratio (LA/(LA+LB)) were as shown in Table 5 below.

[Weight]

The weight of each tire was measured. The results are shown in Tables 1 to 6 below as indexes with the value of Comparative Example 1 being defined as 100. The lower the value is, the better the result is, that is, the lower the weight is.

[Functionality]

Each tire was mounted onto a rim, and the distance (hereinafter, referred to as projecting distance) from the end of a flange of the rim to the top of the rim protector was measured. A largest rim (size=8.5J) and a smallest rim (size=7.0J) were selected from among applicable rims, and the projecting distance was measured for each rim. When the largest rim was used, a load was not applied, and the projecting distance (hereinafter, referred to as maximum projecting distance) was measured. When the smallest rim was used, a load corresponding to twice the "LOAD CAPACITY" in the ETRTO standard was applied, and the projecting distance (hereinafter, referred to as minimum projecting distance) was measured. The average of the maximum projecting distance and the minimum projecting distance was calculated. The results are shown as indexes in Tables 1 to 6 below. The higher the value is, the better the result is. That is, a higher value represents that even with the smallest rim or the largest rim, the projecting distance of the rim protector is appropriately maintained so that the rim protector sufficiently exerts its function.

[Lateral Stiffness]

Each tire was mounted onto a 7.5J rim and inflated with air to an internal pressure of 230 kPa. A vertical load (1.5 kN) was applied, and the tire was brought into contact with the ground. Then, a repulsive force and an amount of movement of the central position of the tread when a lateral load (0.5 kN) was applied were measured, and a lateral stiffness was calculated. The results are shown as indexes in Tables 1 to 6 below. The higher the value is, the better the result is, that is, the higher the lateral stiffness is.

[Rolling Resistance Coefficient]

A rolling resistance coefficient (RRC) was measured under the following measurement conditions by using a rolling resistance tester.

Used rim: 7.5J (made of an aluminum alloy)
Internal pressure: 250 kPa
Load: 5.26 kN
Speed: 80 km/h The results are shown as indexes in Tables 1 to 6 below. The lower the value is, the better the result is, that is, the lower the rolling resistance coefficient is.

TABLE 1

| | Results of Evaluation | | | | | |
|---|---|---|---|---|---|---|
| | Comp. Ex. 1 | Ex. 1 | Ex. 2 | Ex. 3 | Ex. 4 | Ex. 5 |
| Radius of curvature R1 [mm] | 45 | 300 | 150 | 250 | 380 | 450 |
| Radius of curvature R2 [mm] | 8 | 25 | 25 | 25 | 25 | 25 |
| Height H [mm] | 25 | 30 | 30 | 30 | 30 | 30 |
| Length W [mm] | 12 | 15 | 15 | 15 | 15 | 15 |
| Length LA [mm] | 2.5 | 2.5 | 2.5 | 2.5 | 2.5 | 2.5 |
| Length LB [mm] | 3.0 | 10.5 | 10.5 | 10.5 | 10.5 | 10.5 |
| Sum (LA + LB) [mm] | 5.5 | 13.0 | 13.0 | 13.0 | 13.0 | 13.0 |
| Ratio (R2/R1) [mm] | 0.178 | 0.083 | 0.167 | 0.100 | 0.066 | 0.056 |
| Ratio (H/SH) [mm] | 0.254 | 0.305 | 0.305 | 0.305 | 0.305 | 0.305 |
| Ratio ((LA + LB)/W) [—] | 0.458 | 0.867 | 0.867 | 0.867 | 0.867 | 0.867 |
| Ratio (LA/(LA + LB)) [—] | 0.455 | 0.192 | 0.192 | 0.192 | 0.192 | 0.192 |
| Weight | 100.0 | 101.0 | 102.0 | 101.0 | 100.5 | 100.5 |
| Functionality | 3.0 | 4.5 | 4.5 | 4.5 | 4.5 | 4.0 |
| Lateral stiffness | 3.0 | 4.5 | 4.5 | 4.5 | 4.0 | 4.0 |
| Rolling resistance | 3.0 | 3.0 | 3.0 | 3.0 | 3.0 | 3.5 |

TABLE 2

Results of Evaluation

|  | Ex. 6 | Ex. 7 | Ex. 8 | Ex. 9 | Ex. 10 |
|---|---|---|---|---|---|
| Radius of curvature R1 [mm] | 300 | 300 | 300 | 300 | 300 |
| Radius of curvature R2 [mm] | 15 | 20 | 30 | 35 | 40 |
| Height H [mm] | 30 | 30 | 30 | 30 | 30 |
| Length W [mm] | 15 | 15 | 15 | 15 | 15 |
| Length LA [mm] | 2.5 | 2.5 | 2.5 | 2.5 | 2.5 |
| Length LB [mm] | 10.5 | 10.5 | 10.5 | 10.5 | 10.5 |
| Sum (LA + LB) [mm] | 13.0 | 13.0 | 13.0 | 13.0 | 13.0 |
| Ratio (R2/R1) [mm] | 0.050 | 0.067 | 0.100 | 0.117 | 0.133 |
| Ratio (H/SH) [mm] | 0.305 | 0.305 | 0.305 | 0.305 | 0.305 |
| Ratio ((LA + LB)/W) [—] | 0.867 | 0.867 | 0.867 | 0.867 | 0.867 |
| Ratio (LA/(LA + LB)) [—] | 0.192 | 0.192 | 0.192 | 0.192 | 0.192 |
| Weight | 100.5 | 100.5 | 101.0 | 101.5 | 102.0 |
| Functionality | 4.0 | 4.5 | 4.5 | 4.5 | 4.5 |
| Lateral stiffness | 4.0 | 4.0 | 4.5 | 4.5 | 4.5 |
| Rolling resistance | 3.5 | 3.0 | 3.0 | 3.0 | 3.0 |

TABLE 3

Results of Evaluation

|  | Comp. Ex. 2 | Ex. 11 | Ex. 12 | Ex. 13 | Ex. 14 | Comp. Ex. 3 |
|---|---|---|---|---|---|---|
| Radius of curvature R1 [mm] | 300 | 300 | 300 | 300 | 300 | 300 |
| Radius of curvature R2 [mm] | 25 | 25 | 25 | 25 | 25 | 25 |
| Height H [mm] | 25 | 27 | 28 | 31 | 33 | 35 |
| Length W [mm] | 15 | 15 | 15 | 15 | 15 | 15 |
| Length LA [mm] | 2.5 | 2.5 | 2.5 | 2.5 | 2.5 | 2.5 |
| Length LB [mm] | 10.5 | 10.5 | 10.5 | 10.5 | 10.5 | 10.5 |
| Sum (LA + LB) [mm] | 13.0 | 13.0 | 13.0 | 13.0 | 13.0 | 13.0 |
| Ratio (R2/R1) [mm] | 0.083 | 0.083 | 0.083 | 0.083 | 0.083 | 0.083 |
| Ratio (H/SH) [mm] | 0.254 | 0.274 | 0.284 | 0.315 | 0.335 | 0.355 |
| Ratio ((LA + LB)/W) [—] | 0.867 | 0.867 | 0.867 | 0.867 | 0.867 | 0.867 |
| Ratio (LA/(LA + LB)) [—] | 0.192 | 0.192 | 0.192 | 0.192 | 0.192 | 0.192 |
| Weight | 103.0 | 102.0 | 101.5 | 100.0 | 99.5 | 99.0 |
| Functionality | 4.5 | 4.5 | 4.5 | 4.0 | 3.5 | 3.0 |
| Lateral stiffness | 4.5 | 4.5 | 4.5 | 4.0 | 3.5 | 3.0 |
| Rolling resistance | 4.0 | 3.5 | 3.0 | 3.0 | 3.0 | 3.0 |

TABLE 4

Results of Evaluation

|  | Comp. Ex. 4 | Ex. 15 | Ex. 16 | Ex. 17 | Ex. 18 | Comp. Ex. 5 |
|---|---|---|---|---|---|---|
| Radius of curvature R1 [mm] | 300 | 300 | 300 | 300 | 300 | 300 |
| Radius of curvature R2 [mm] | 25 | 25 | 25 | 25 | 25 | 25 |
| Height H [mm] | 30 | 30 | 30 | 30 | 30 | 30 |
| Length W [mm] | 10 | 12 | 14 | 17 | 18 | 20 |
| Length LA [mm] | 2.5 | 2.5 | 2.5 | 2.5 | 2.5 | 2.5 |
| Length LB [mm] | 10.5 | 10.5 | 10.5 | 10.5 | 10.5 | 10.5 |
| Sum (LA + LB) [mm] | 13.0 | 13.0 | 13.0 | 13.0 | 13.0 | 13.0 |
| Ratio (R2/R1) [mm] | 0.083 | 0.083 | 0.083 | 0.083 | 0.083 | 0.083 |
| Ratio (H/SH) [mm] | 0.305 | 0.305 | 0.305 | 0.305 | 0.305 | 0.305 |
| Ratio ((LA + LB)/W) [—] | 1.300 | 1.083 | 0.929 | 0.765 | 0.722 | 0.650 |
| Ratio (LA/(LA + LB)) [—] | 0.192 | 0.192 | 0.192 | 0.192 | 0.192 | 0.192 |
| Weight | 98.5 | 99.0 | 100.0 | 101.5 | 102.0 | 103.0 |
| Functionality | 3.0 | 3.5 | 4.0 | 5.0 | 5.0 | 5.0 |
| Lateral stiffness | 3.0 | 3.5 | 4.0 | 4.5 | 5.0 | 5.0 |
| Rolling resistance | 3.0 | 3.0 | 3.0 | 3.0 | 3.5 | 4.0 |

TABLE 5

Results of Evaluation

|  | Ex. 19 | Ex. 20 | Ex. 21 | Ex. 22 |
|---|---|---|---|---|
| Radius of curvature R1 [mm] | 300 | 300 | 300 | 300 |
| Radius of curvature R2 [mm] | 25 | 25 | 25 | 25 |
| Height H [mm] | 30 | 30 | 30 | 30 |
| Length W [mm] | 15 | 15 | 15 | 15 |
| Length LA [mm] | 2.5 | 2.5 | 2.5 | 2.5 |
| Length LB [mm] | 9.0 | 9.5 | 11.5 | 12.0 |
| Sum (LA + LB) [mm] | 11.5 | 12.0 | 14.0 | 14.5 |
| Ratio (R2/R1) [mm] | 0.083 | 0.083 | 0.083 | 0.083 |
| Ratio (H/SH) [mm] | 0.305 | 0.305 | 0.305 | 0.305 |
| Ratio ((LA + LB)/W) [—] | 0.767 | 0.800 | 0.933 | 0.967 |
| Ratio (LA/(LA + LB)) [—] | 0.217 | 0.208 | 0.179 | 0.172 |
| Weight | 100.5 | 101.0 | 101.5 | 102.0 |
| Functionality | 3.5 | 4.0 | 5.0 | 5.0 |
| Lateral stiffness | 3.5 | 4.0 | 4.5 | 5.0 |
| Rolling resistance | 2.5 | 3.0 | 3.0 | 3.5 |

TABLE 6

Results of Evaluation

|  | Ex. 23 | Ex. 24 | Ex. 25 | Ex. 26 |
|---|---|---|---|---|
| Radius of curvature R1 [mm] | 300 | 300 | 300 | 300 |
| Radius of curvature R2 [mm] | 25 | 25 | 25 | 25 |
| Height H [mm] | 30 | 30 | 30 | 30 |
| Length W [mm] | 15 | 15 | 15 | 15 |
| Length LA [mm] | 1.5 | 2.0 | 3.0 | 3.5 |
| Length LB [mm] | 10.5 | 10.5 | 10.5 | 10.5 |
| Sum (LA + LB) [mm] | 12.0 | 12.5 | 13.5 | 14.0 |
| Ratio (R2/R1) [mm] | 0.083 | 0.083 | 0.083 | 0.083 |
| Ratio (H/SH) [mm] | 0.305 | 0.305 | 0.305 | 0.305 |
| Ratio ((LA + LB)/W) [—] | 0.800 | 0.833 | 0.900 | 0.933 |
| Ratio (LA/(LA + LB)) [—] | 0.125 | 0.160 | 0.222 | 0.250 |
| Weight | 100.0 | 100.5 | 101.5 | 102.0 |
| Functionality | 3.5 | 4.0 | 4.5 | 4.5 |
| Lateral stiffness | 3.5 | 4.0 | 4.5 | 4.5 |
| Rolling resistance | 3.0 | 3.0 | 3.0 | 3.5 |

As shown in Tables 1 to 6, the evaluation is higher in the tires of the examples than in the tires of the comparative examples. From the results of evaluation, advantages of the present invention are clear.

Experiment 2

Example 101

The tire shown in FIGS. 3 and 4 was produced. The size of the tire is 225/45R17. The specifications of Example 101 are as shown in Table 7 below. In Example 101, the radius of curvature Rs of the outer circular arc of the reference surface was 35 mm, and the radius of curvature Ru of the inner circular arc of the reference surface was 50 mm. In order to obtain the specifications in Table 7, the radius of curvature R1 of the first circular arc, which represents the profile of the first inclined surface of the rim protector, was set to 300.0 mm, and the radius of curvature R2 of the second circular arc, which represents the profile of the second inclined surface of the rim protector, was set to 25.0 mm.

Comparative Example 101

A tire of Comparative Example 101 is a conventional tire. The specifications of Comparative Example 101 are as shown in Table 7 below. In Comparative Example 101, the first circular arc, which represents the profile of the first inclined surface of the rim protector, had a shape projecting inward. The radius of curvature R1 of the first circular arc was set to 45.0 mm, and the radius of curvature R2 of the second circular arc, which represents the profile of the second inclined surface of the rim protector, was set to 8.0 mm.

Examples 102 to 105

Tires of Examples 102 to 105 were obtained in the same manner as in Example 101, except the height H in the radial direction from the bead base line to the top PT of the rim protector was changed such that the ratio (H/SH) of the height H relative to the cross-sectional height SH was as shown in Table 7 below.

Examples 106 to 109

Tires of Examples 106 to 109 were obtained in the same manner as in Example 101, except the thickness E of the side piece at the first reference position PW was changed such that the ratio (E/F) of the thickness E relative to the thickness F of the side piece at the top PT of the rim protector was as shown in Table 8 below.

Examples 110 to 113 and Comparative Example 102

Tires of Examples 110 to 113 and Comparative Example 102 were obtained in the same manner as in Example 101, except the thickness F was changed such that the ratio (G/F) of the thickness G of the side piece at the second reference position PB2 relative to the thickness F, the ratio (E/F) and the ratio (F/SH) of the thickness F relative to the cross-sectional height SH were as shown in Table 9 below.

Examples 114 to 117

Tires of Examples 114 to 117 were obtained in the same manner as in Example 101, except the thickness G was changed such that the ratio (G/F) was as shown in Table 10 below.

[Weight]

The weight of each tire was measured. The results are shown in Tables 7 to 10 below as indexes with the value of Comparative Example 101 being defined as 100. The lower the value is, the better the result is, that is, the lower the weight is.

[Functionality]

Each tire was mounted onto a rim, and the distance (hereinafter, referred to as projecting distance) from the end of a flange of the rim to the top of the rim protector was measured. A largest rim (size=8.5J) and a smallest rim (size=7.0J) were selected from among applicable rims, and the projecting distance was measured for each rim. When the largest rim was used, a load was not applied, and the projecting distance (hereinafter, referred to as maximum projecting distance) was measured. When the smallest rim was used, a load corresponding to twice the "LOAD CAPACITY" in the ETRTO standard was applied, and the projecting distance (hereinafter, referred to as minimum projecting distance) was measured. The average of the maximum projecting distance and the minimum projecting distance was calculated. The results are shown as indexes in Tables 7 to 10 below. The higher the value is, the better the result is. That is, a higher value represents that even with the smallest rim or the largest rim, the projecting distance of the rim protector is appropriately maintained so that the rim protector sufficiently exerts its function.

[Lateral Stiffness]

Each tire was mounted onto a 7.5J rim and inflated with air to an internal pressure of 230 kPa. A vertical load (1.5 kN) was applied, and the tire was brought into contact with the ground. Then, a repulsive force and an amount of movement of the central position of the tread when a lateral load (0.5 kN) was applied were measured, and a lateral stiffness was calculated. The results are shown as indexes in Tables 7 to 10 below. The higher the value is, the better the result is, that is, the higher the lateral stiffness is.

[Rolling Resistance Coefficient]

A rolling resistance coefficient (RRC) was measured under the following measurement conditions by using a rolling resistance tester.

Used rim: 7.5J (made of an aluminum alloy)
Internal pressure: 250 kPa
Load: 5.26 kN
Speed: 80 km/h The results are shown as indexes in Tables 7 to 10 below. The lower the value is, the better the result is, that is, the lower the rolling resistance coefficient is.

TABLE 7

Results of Evaluation

| | Comp. Ex. 101 | Ex. 101 | Ex. 102 | Ex. 103 | Ex. 104 | Ex. 105 |
|---|---|---|---|---|---|---|
| Height H [mm] | 25.0 | 30.0 | 27.0 | 29.0 | 31.0 | 33.0 |
| Thickness E [mm] | 4.0 | 3.0 | 3.0 | 3.0 | 3.0 | 3.0 |
| Thickness F [mm] | 9.5 | 12.0 | 12.0 | 12.0 | 12.0 | 12.0 |
| Thickness G [mm] | 5.0 | 6.0 | 6.0 | 6.0 | 6.0 | 6.0 |
| Ratio (H/SH) [—] | 0.254 | 0.305 | 0.274 | 0.294 | 0.315 | 0.335 |
| Ratio (G/F) [—] | 0.526 | 0.500 | 0.500 | 0.500 | 0.500 | 0.500 |
| Ratio (E/F) [—] | 0.421 | 0.250 | 0.250 | 0.250 | 0.250 | 0.250 |
| Ratio (F/SH) [—] | 0.096 | 0.122 | 0.122 | 0.122 | 0.122 | 0.122 |
| Weight | 100.0 | 101.0 | 102.0 | 101.0 | 100.5 | 99.5 |
| Functionality | 3.0 | 4.5 | 4.5 | 4.5 | 4.5 | 4.0 |
| Lateral stiffness | 3.0 | 4.5 | 4.5 | 4.5 | 4.5 | 4.0 |
| Rolling resistance | 3.0 | 3.0 | 3.5 | 3.0 | 3.0 | 3.0 |

TABLE 8

Results of Evaluation

| | Ex. 106 | Ex. 107 | Ex. 108 | Ex. 109 |
|---|---|---|---|---|
| Height H [mm] | 30.0 | 30.0 | 30.0 | 30.0 |
| Thickness E [mm] | 2.5 | 2.7 | 3.2 | 3.5 |
| Thickness F [mm] | 12.0 | 12.0 | 12.0 | 12.0 |
| Thickness G [mm] | 6.0 | 6.0 | 6.0 | 6.0 |
| Ratio (H/SH) [—] | 0.305 | 0.305 | 0.305 | 0.305 |
| Ratio (G/F) [—] | 0.500 | 0.500 | 0.500 | 0.500 |
| Ratio (E/F) [—] | 0.208 | 0.225 | 0.267 | 0.292 |
| Ratio (F/SH) [—] | 0.122 | 0.122 | 0.122 | 0.122 |
| Weight | 100.5 | 100.5 | 101.0 | 101.5 |
| Functionality | 4.0 | 4.5 | 4.5 | 5.0 |
| Lateral stiffness | 4.0 | 4.5 | 4.5 | 5.0 |
| Rolling resistance | 2.5 | 2.5 | 3.0 | 4.0 |

TABLE 9

Results of Evaluation

| | Comp. Ex. 102 | Ex. 110 | Ex. 111 | Ex. 112 | Ex. 113 |
|---|---|---|---|---|---|
| Height H [mm] | 30.0 | 30.0 | 30.0 | 30.0 | 30.0 |
| Thickness E [mm] | 3.0 | 3.0 | 3.0 | 3.0 | 3.0 |
| Thickness F [mm] | 9.5 | 10.0 | 11.0 | 13.0 | 14.5 |
| Thickness G [mm] | 6.0 | 6.0 | 6.0 | 6.0 | 6.0 |
| Ratio (H/SH) [—] | 0.305 | 0.305 | 0.305 | 0.305 | 0.305 |
| Ratio (G/F) [—] | 0.632 | 0.600 | 0.545 | 0.462 | 0.414 |
| Ratio (E/F) [—] | 0.316 | 0.300 | 0.273 | 0.231 | 0.207 |
| Ratio (F/SH) [—] | 0.096 | 0.107 | 0.112 | 0.132 | 0.147 |
| Weight | 99.0 | 100.5 | 101.0 | 101.0 | 102.5 |
| Functionality | 3.0 | 4.0 | 4.5 | 4.5 | 5.0 |
| Lateral stiffness | 3.0 | 4.0 | 4.5 | 4.5 | 5.0 |
| Rolling resistance | 3.0 | 3.0 | 3.0 | 3.0 | 3.0 |

TABLE 10

Results of Evaluation

| | Ex. 114 | Ex. 115 | Ex. 116 | Ex. 117 |
|---|---|---|---|---|
| Height H [mm] | 30.0 | 30.0 | 30.0 | 30.0 |
| Thickness E [mm] | 3.0 | 3.0 | 3.0 | 3.0 |
| Thickness F [mm] | 12.0 | 12.0 | 12.0 | 12.0 |
| Thickness G [mm] | 4.5 | 5.5 | 6.5 | 7.5 |
| Ratio (H/SH) [—] | 0.305 | 0.305 | 0.305 | 0.305 |
| Ratio (G/F) [—] | 0.375 | 0.458 | 0.542 | 0.625 |
| Ratio (E/F) [—] | 0.250 | 0.250 | 0.250 | 0.250 |
| Ratio (F/SH) [—] | 0.122 | 0.122 | 0.122 | 0.122 |
| Weight | 100.0 | 101.0 | 101.0 | 102.0 |
| Functionality | 4.0 | 4.5 | 4.5 | 4.5 |
| Lateral stiffness | 4.0 | 4.5 | 4.5 | 4.5 |
| Rolling resistance | 3.0 | 3.0 | 3.0 | 3.0 |

As shown in Tables 7 to 10, the evaluation is higher in the tires of the examples than in the tires of the comparative examples. From the results of evaluation, advantages of the present invention are clear.

Experiment 3

Example 201

The tire shown in FIGS. 5 and 6 was produced. The size of the tire is 225/45R17. The specifications of Example 201 are as shown in Table 11 below. In Example 201, the radius of curvature Rs of the outer circular arc of the reference surface was 35 mm, and the radius of curvature Ru of the inner circular arc of the reference surface was 50 mm. In order to obtain the specifications in Table 11, the radius of curvature R1 of the first circular arc, which represents the profile of the first inclined surface of the rim protector, was set to 300.0 mm, and the radius of curvature R2 of the second circular arc, which represents the profile of the second inclined surface of the rim protector, was set to 25.0 mm.

Comparative Example 201

A tire of Comparative Example 201 is a conventional tire. The specifications of Comparative Example 201 are as shown in Table 11 below. In Comparative Example 201, the first circular arc, which represents the profile of the first inclined surface of the rim protector, had a shape projecting inward. The radius of curvature R1 of the first circular arc was set to 45.0 mm, and the radius of curvature R2 of the second circular arc, which represents the profile of the second inclined surface of the rim protector, was set to 8.0 mm.

Examples 202 to 205

Tires of Examples 202 to 205 were obtained in the same manner as in Example 201, except the height H in the radial direction from the bead base line to the top PT of the rim protector was changed such that the ratio (H/SH) of the height H relative to the cross-sectional height SH was as shown in Table 11 below.

Examples 206 to 209 and Comparative Examples 202 and 203

Tires of Examples 206 to 209 and Comparative Examples 202 and 203 were obtained in the same manner as in Example 201, except the area S1 of the region Z1 surrounded by the outer surface of the main body, the first inclined surface, and the second inclined surface was changed such that a ratio (S2/(S1+S2)) was as shown in Table 12 below.

Examples 210 and 211

Tires of Examples 210 and 211 were obtained in the same manner as in Example 201, except the area S2 of the region Z2 surrounded by the reference line segment AL and the outer surface of the main body was changed such that the ratio (S2/(S1+S2)) was as shown in Table 13 below.

[Weight]

The weight of each tire was measured. The results are shown in Tables 11 to 13 below as indexes with the value of Comparative Example 201 being defined as 100. The lower the value is, the better the result is, that is, the lower the weight is.

[Functionality]

Each tire was mounted onto a rim, and the distance (hereinafter, referred to as projecting distance) from the end of a flange of the rim to the top of the rim protector was measured. A largest rim (size=8.5J) and a smallest rim (size=7.0J) were selected from among applicable rims, and the projecting distance was measured for each rim. When the largest rim was used, a load was not applied, and the projecting distance (hereinafter, referred to as maximum projecting distance) was measured. When the smallest rim was used, a load corresponding to twice the "LOAD CAPACITY" in the ETRTO standard was applied, and the projecting distance (hereinafter, referred to as minimum projecting distance) was measured. The average of the maximum projecting distance and the minimum projecting distance was calculated. The results are shown as indexes in Tables 11 to 13 below. The higher the value is, the better the result is. That is, a higher value represents that even with the smallest rim or the largest rim, the projecting distance of the rim protector is appropriately maintained so that the rim protector sufficiently exerts its function.

[Lateral Stiffness]

Each tire was mounted onto a 7.5J rim and inflated with air to an internal pressure of 230 kPa. A vertical load (1.5 kN) was applied, and the tire was brought into contact with the ground. Then, a repulsive force and an amount of movement of the central position of the tread when a lateral load (0.5 kN) was applied were measured, and a lateral stiffness was calculated. The results are shown as indexes in Tables 11 to 13 below. The higher the value is, the better the result is, that is, the higher the lateral stiffness is.

[Rolling Resistance Coefficient]

A rolling resistance coefficient (RRC) was measured under the following measurement conditions by using a rolling resistance tester.

Used rim: 7.5J (made of an aluminum alloy)

Internal pressure: 250 kPa

Load: 5.26 kN

Speed: 80 km/h

The results are shown as indexes in Tables 11 to 13 below. The lower the value is, the better the result is, that is, the lower the rolling resistance coefficient is.

TABLE 11

Results of Evaluation

| | Comp. Ex. 201 | Ex. 201 | Ex. 202 | Ex. 203 | Ex. 204 | Ex. 205 |
|---|---|---|---|---|---|---|
| Height H [mm] | 25 | 30 | 27 | 28 | 31 | 33 |
| Area S1 [mm$^2$] | 35.0 | 96.9 | 96.9 | 96.9 | 96.9 | 96.9 |
| Area S2 [mm$^2$] | 19.5 | 75.8 | 75.8 | 75.8 | 75.8 | 75.8 |
| H/SH [—] | 0.254 | 0.305 | 0.274 | 0.284 | 0.315 | 0.335 |
| S2/(S1 + S2) [—] | 0.358 | 0.439 | 0.439 | 0.439 | 0.439 | 0.439 |
| Weight | 100.0 | 101.0 | 102.0 | 101.5 | 100.0 | 99.5 |
| Functionality | 3.0 | 4.5 | 4.5 | 4.5 | 4.5 | 4.0 |
| Lateral stiffness | 3.0 | 4.5 | 4.5 | 4.5 | 4.5 | 4.0 |
| Rolling resistance | 3.0 | 3.0 | 3.5 | 3.0 | 3.0 | 3.0 |

TABLE 12

Results of Evaluation

| | Comp. Ex. 202 | Ex. 206 | Ex. 207 | Ex. 208 | Ex. 209 | Comp. Ex. 203 |
|---|---|---|---|---|---|---|
| Height H [mm] | 30 | 30 | 30 | 30 | 30 | 30 |
| Area S1 [mm$^2$] | 77.3 | 82.4 | 88.7 | 105.9 | 111.4 | 122.6 |
| Area S2 [mm$^2$] | 75.8 | 75.8 | 75.8 | 75.8 | 75.8 | 75.8 |
| H/SH [—] | 0.305 | 0.305 | 0.305 | 0.305 | 0.305 | 0.305 |
| S2/(S1 + S2) [—] | 0.495 | 0.479 | 0.461 | 0.417 | 0.405 | 0.382 |
| Weight | 100.0 | 100.5 | 100.5 | 101.5 | 102.0 | 103.0 |
| Functionality | 3.0 | 4.0 | 4.5 | 5.0 | 5.0 | 5.0 |
| Lateral stiffness | 3.0 | 4.0 | 4.5 | 5.0 | 5.0 | 5.0 |
| Rolling resistance | 3.0 | 3.0 | 3.0 | 3.0 | 3.5 | 4.0 |

TABLE 13

| Results of Evaluation | | |
|---|---|---|
| | Ex. 210 | Ex. 211 |
| Height H [mm] | 30 | 30 |
| Area S1 [mm²] | 96.9 | 96.9 |
| Area S2 [mm²] | 71.6 | 81.9 |
| H/SH [—] | 0.305 | 0.305 |
| S2/(S1 + S2) [—] | 0.425 | 0.458 |
| Weight | 101.0 | 101.0 |
| Functionality | 4.5 | 4.5 |
| Lateral stiffness | 4.5 | 4.5 |
| Rolling resistance | 3.0 | 3.0 |

As shown in Tables 11 to 13, the evaluation is higher in the tires of the examples than in the tires of the comparative examples. From the results of evaluation, advantages of the present invention are clear.

The rim protector described above is applicable to various types of tires. The above descriptions are merely illustrative examples, and various modifications can be made without departing from the principles of the present invention.

What is claimed is:

1. A pneumatic tire comprising:
a tread;
a pair of side pieces;
a pair of beads; and
a carcass, wherein
each side piece extends from the tread substantially inward in a radial direction,
each bead is located inward of the side piece in an axial direction at a radially inner portion of the side piece,
the carcass extends along inner sides of the tread and the side pieces and on and between the one bead and the other bead,
each side piece includes a rim protector extending in a circumferential direction,
the rim protector projects from a reference surface of the side piece outward in the axial direction and has a first inclined surface extending from a top of the rim protector substantially outward in the radial direction and a second inclined surface extending from the top of the rim protector substantially inward in the radial direction,
the top of the rim protector is formed at an intersection between the first inclined surface and the second inclined surface,
a line tangent to the first inclined surface at the top extends outward in the radial direction so as to be inclined inward in the axial direction,
a profile of the reference surface includes an outer circular arc extending substantially outward in the radial direction from a reference position corresponding to a position at which a profile of the tire has a maximum width in the axial direction, and an inner circular arc extending substantially inward in the radial direction from the reference position,
the outer circular arc and the inner circular arc are tangent to each other at the reference position,
when each of a profile of the first inclined surface and a profile of the second inclined surface is represented by a circular arc, the circular arc that represents the profile of the first inclined surface is defined as a first circular arc, and the circular arc that represents the profile of the second inclined surface is defined as a second circular arc, the first circular arc is tangent to the outer circular arc and the second circular arc is tangent to the inner circular arc,
wherein a ratio of a radius of curvature R2 of the second circular arc relative to a radius of curvature R1 of the first circular arc is equal to or greater than 0.066 and equal to or less than 0.117,
a ratio of a height H in the radial direction from a bead base line of the tire to the top relative to a cross-sectional height SH of the tire is equal to or greater than 0.27 and equal to or less than 0.34, and
a projecting length W of the rim protector is equal to or greater than 12 mm and equal to or less than 18 mm, and
a ratio of a radius of curvature Ru of the inner circular arc relative to a radius of curvature Rs of the outer circular arc is equal to or greater than 1.38 and equal to or less than 1.48.

2. The pneumatic tire according to claim 1, wherein
the first inclined surface has a shape projecting outward, and
the second inclined surface has a shape projecting inward.

3. The pneumatic tire according to claim 1, wherein
each side piece includes a sidewall extending from the tread substantially inward in the radial direction and a clinch located inward of the sidewall in the radial direction,
a radially outer surface of the clinch intersects the carcass and the reference surface, and
a ratio of a sum (LA+LB) of a length LA from a point of intersection PA between the outer surface and the carcass to a point of intersection PB between the outer surface and the reference surface and a length LB from the point of intersection PB to the top, relative to the projecting length W, is equal to or greater than 0.77 and equal to or less than 0.97.

4. The pneumatic tire according to claim 3, wherein a ratio of the length LA relative to the sum (LA+LB) is equal to or greater than 0.13 and equal to or less than 0.25.

5. A pneumatic tire comprising:
a tread;
a pair of side pieces;
a pair of beads; and
a carcass, wherein
each side piece extends from an edge of the tread substantially inward in a radial direction,
each bead is located inward of the side piece in an axial direction at a radially inner portion of the side piece,
the carcass extends along inner sides of the tread and the side pieces and on and between the one bead and the other bead,
each side piece includes a main body and a rim protector projecting from the main body outward in the axial direction,
the rim protector extends in a circumferential direction,
the rim protector has a first inclined surface extending from a top of the rim protector substantially outward in the radial direction and a second inclined surface extending from the top of the rim protector substantially inward in the radial direction,
the top of the rim protector is formed at an intersection between the first inclined surface and the second inclined surface,
a line tangent to the first inclined surface at the top extends outward in the radial direction so as to be inclined inward in the axial direction, a profile of an outer surface of the main body is represented by a plurality of circular arcs aligned in the radial direction, these circular arcs include an outer circular arc extending substantially outward in the radial direction from a first reference position corresponding to a position at which a profile of the tire has a maximum width in the axial direction, and an inner circular arc extending substantially inward in the radial direction from the first reference position, the outer circular arc and the inner circular arc are tangent to each other at the first reference position, when each of a profile of the first inclined surface and a profile of the second inclined surface is represented by a circular arc, the circular arc that represents the profile of the first inclined surface is defined as a first circular arc, and the circular arc that represents the profile of the second inclined surface is defined as a second circular arc, the first circular arc is tangent to the outer circular arc and the second circular arc is tangent to the inner circular arc, a ratio of a thickness E of the side piece at the first reference position relative to a thickness F of the side piece at the top is equal to or greater than 0.20 and equal to or less than 0.30, and a ratio of a height H in the radial direction from a bead base line of the tire to the top relative to a cross-sectional height SH of the tire is equal to or greater than 0.27 and equal to or less than 0.34, and a ratio of a radius of curvature Ru of the inner circular arc relative to a radius of curvature Rs of the outer circular arc is equal to or greater than 1.38 and equal to or less than 1.48.

6. The pneumatic tire according to claim 5, wherein when a position on an outer surface of the tire at which position a height in the radial direction from the bead base line is 22% of the cross-sectional height SH is defined as a second reference position, a ratio of a thickness G of the side piece at the second reference position relative to the thickness F is equal to or greater than 0.40 and equal to or less than 0.60.

7. The pneumatic tire according to claim 5, wherein
the first inclined surface has a shape projecting outward, and
the second inclined surface has a shape projecting inward.

8. The pneumatic tire according to claim 5, wherein a ratio of the thickness F relative to the cross-sectional height SH is equal to or greater than 0.10 and equal to or less than 0.15.

9. A pneumatic tire comprising:
a tread;
a pair of side pieces;
a pair of beads; and
a carcass, wherein
each side piece extends from an edge of the tread substantially inward in a radial direction,
each bead is located inward of the side piece in an axial direction at a radially inner portion of the side piece,
the carcass extends along inner sides of the tread and the side pieces and on and between the one bead and the other bead,
each side piece includes a main body and a rim protector projecting from an outer surface of the main body outward in the axial direction, a profile of the outer surface of the main body is represented by a plurality of circular arcs aligned in the radial direction, these circular arcs include an outer circular arc extending substantially outward in the radial direction from a reference position corresponding to a position at which a profile of the tire has a maximum width in the axial direction, and an inner circular arc extending substantially inward in the radial direction from the reference position, the outer circular arc and the inner circular arc are tangent to each other at the reference position, the rim protector extends in a circumferential direction, the rim protector has a first inclined surface extending from a top of the rim protector substantially outward in the radial direction and a second inclined surface extending from the top of the rim protector substantially inward in the radial direction, the top of the rim protector is formed at an intersection between the first inclined surface and the second inclined surface, a line tangent to the first inclined surface at the top extends outward in the radial direction so as to be inclined inward in the axial direction, when each of a profile of the first inclined surface and a profile of the second inclined surface is represented by a circular arc, the circular arc that represents the profile of the first inclined surface is defined as a first circular arc, and the circular arc that represents the profile of the second inclined surface is defined as a second circular arc, the first circular arc is tangent to the outer circular arc at a radially outer edge of the first inclined surface, and the second circular arc is tangent to the inner circular arc at a radially inner edge of the second inclined surface, and when a line segment connecting the radially outer edge of the first inclined surface to the radially inner edge of the second inclined surface is defined as a reference line segment, a ratio of an area of a region surrounded by the reference line segment and the outer surface of the main body relative to an area of a region surrounded by the reference line segment, the first inclined surface, and the second inclined surface is equal to or greater than 0.40 and equal to or less than 0.48, and a ratio of a radius of curvature Ru of the inner circular arc relative to a radius of curvature Rs of the outer circular arc is equal to or greater than 1.38 and equal to or less than 1.48.

10. The pneumatic tire according to claim 9, wherein
the first inclined surface has a shape projecting outward, and
the second inclined surface has a shape projecting inward.

11. The pneumatic tire according to claim 9, wherein a ratio of a height H in the radial direction from a bead base line of the tire to the top relative to a cross-sectional height SH of the tire is equal to or greater than 0.27 and equal to or less than 0.34.

* * * * *